(12) United States Patent
Mukai

(10) Patent No.: US 6,839,458 B2
(45) Date of Patent: Jan. 4, 2005

(54) PROCESSING APPARATUS FOR DISCRIMINATING VARIOUS TYPES OF PAPER AND CONTROL METHOD OF PROCRESSING

(75) Inventor: Masanori Mukai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 390 days.

(21) Appl. No.: 10/054,855

(22) Filed: Jan. 25, 2002

(65) Prior Publication Data
US 2002/0066125 A1 May 30, 2002

Related U.S. Application Data

(63) Continuation of application No. PCT/JP99/04217, filed on Aug. 4, 1999.

(51) Int. Cl.[7] .................................. G06K 9/00
(52) U.S. Cl. ...................... 382/135; 382/323
(58) Field of Search .................. 382/100, 112, 382/135, 137, 312, 317, 320, 321, 323; 347/101; 705/45; 209/534; 902/14, 15, 16

(56) References Cited

U.S. PATENT DOCUMENTS 4,058,194 A * 11/1977 Riddle et al. ............... 194/4 C
5,825,911 A * 10/1998 Nishigai et al. ............ 382/135
6,246,776 B1 * 6/2001 Merz et al. ................. 382/100
6,405,929 B1 * 6/2002 Ehrhart et al. .............. 235/486

FOREIGN PATENT DOCUMENTS

| JP | 56-149688 A | 11/1981 | ............ G07D/7/00 |
| JP | 61-74089 A | 4/1986 | ............ G07D/7/00 |
| JP | 9-237361 A | 9/1997 | ............ G07D/7/00 |
| JP | 10-32110 A | 11/1998 | ............ G07D/7/00 |

* cited by examiner

Primary Examiner—Andrew W. Johns
(74) Attorney, Agent, or Firm—Staas & Halsey LLP

(57) ABSTRACT

The processing apparatus for discriminating bank notes has an insert sensor for detecting the insertion of a bank note, line sensors for sampling the pattern and so forth of the bank note, and a sensor memory in which sampling data collected by means of the line sensors is stored for each line. The insert sensor is provided only at the entrance side of the apparatus. If a bank note is conveyed on one side of the line sensor, the data sampling is started when the insert sensor detects the passage of the bank note; if a bank note is conveyed on the other side of the line sensor, the data sampling is started before the bank note is moved. The pattern image data is generated from the sampling data read out from the sensor memory and a bank note is discriminated by comparing the pattern image with a reference pattern. By making the collected pattern image data the same when the bank note is moved forward and when it is moved backward, the reference pattern data is made common, thereby decreasing the required memory capacity.

32 Claims, 21 Drawing Sheets

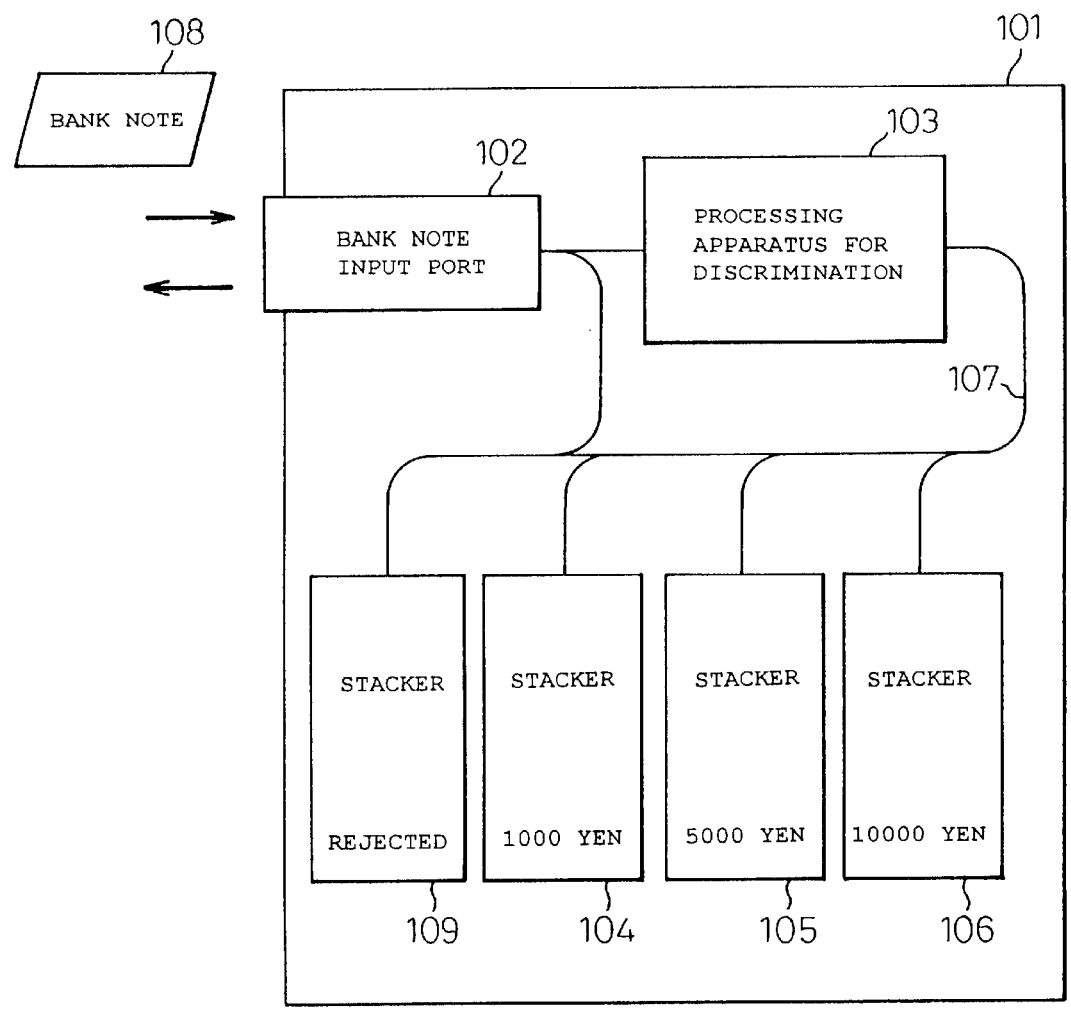

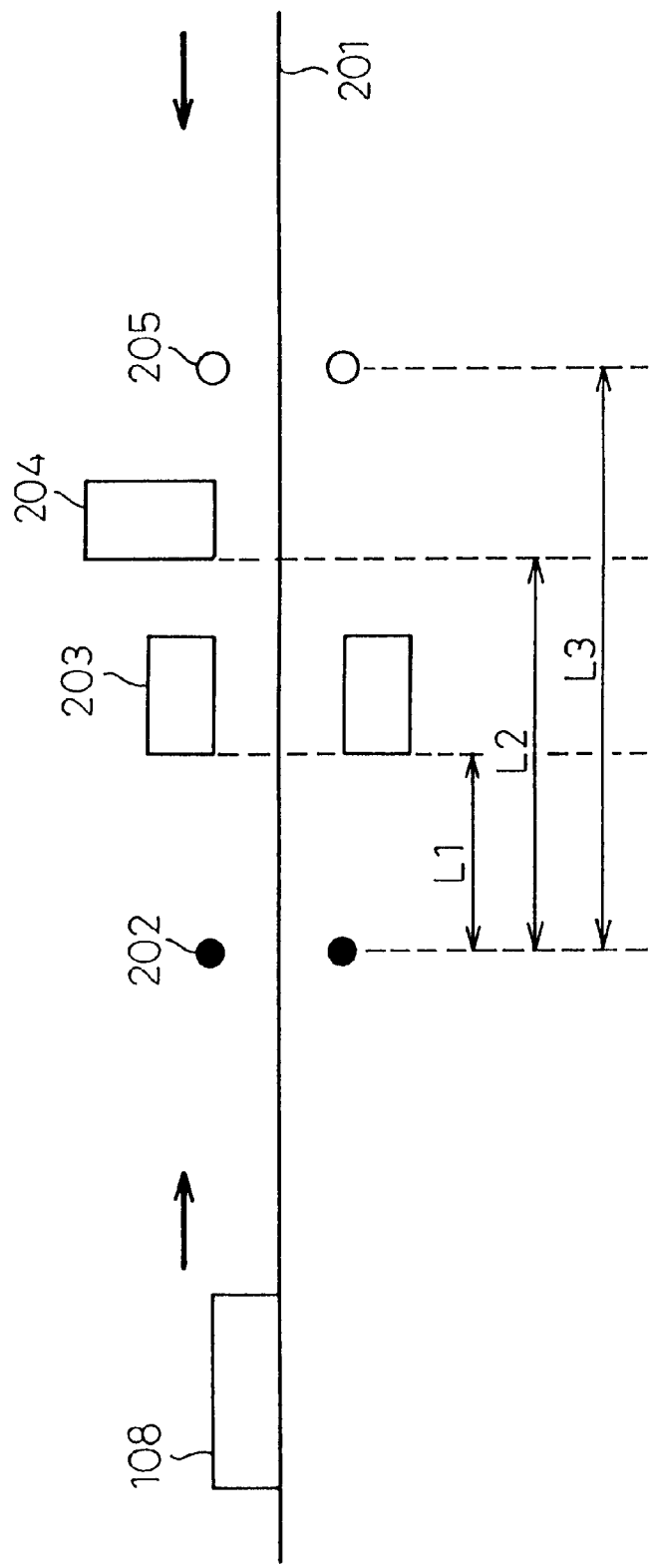

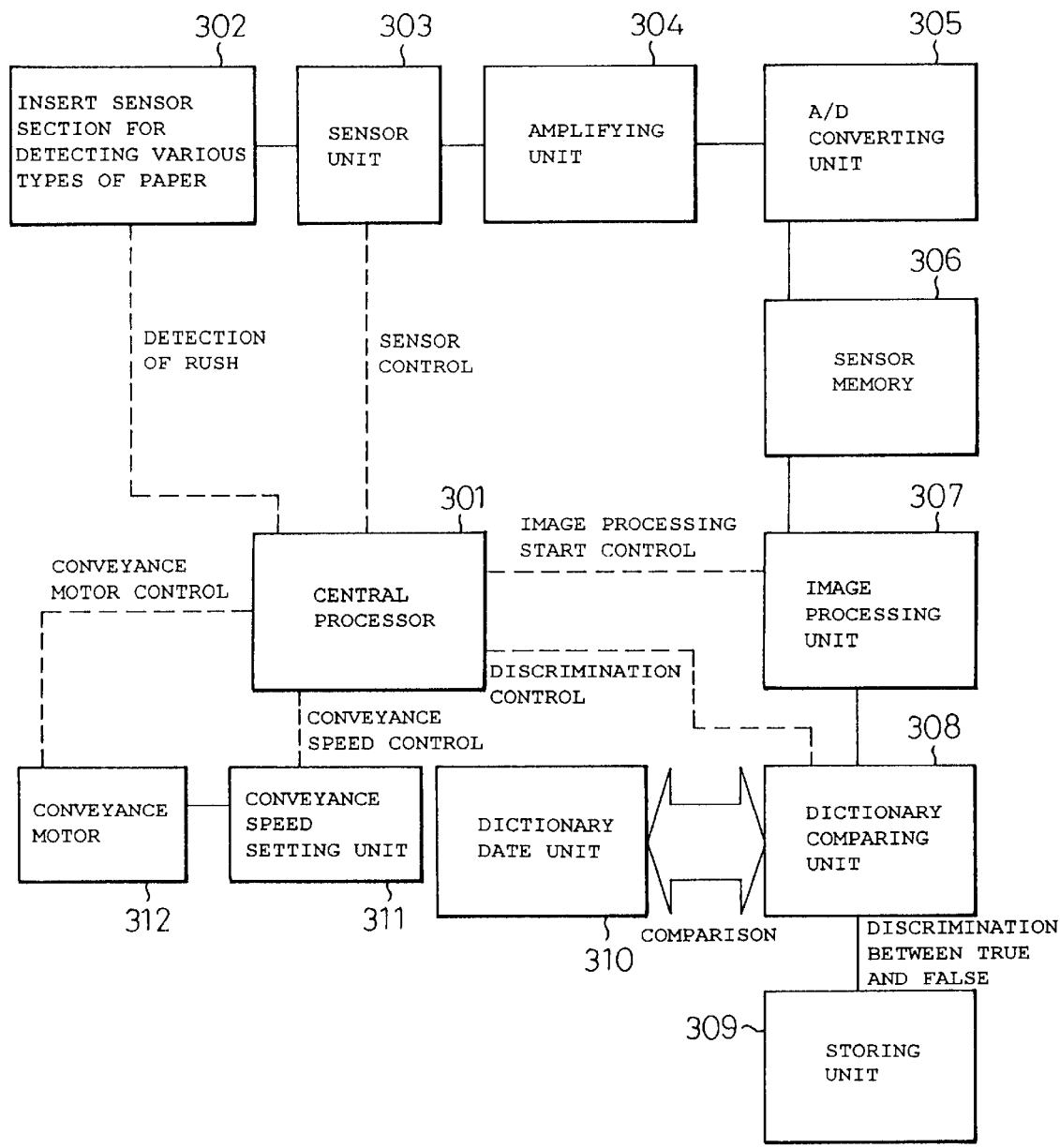

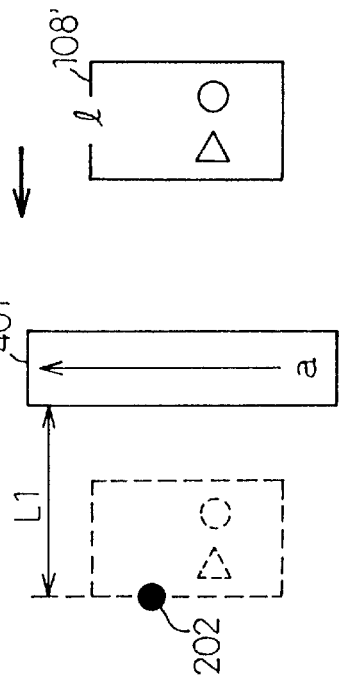
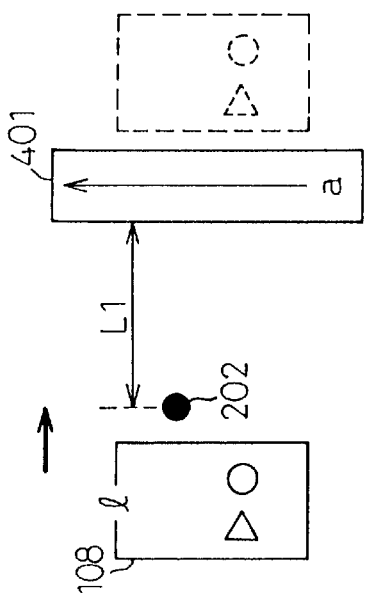
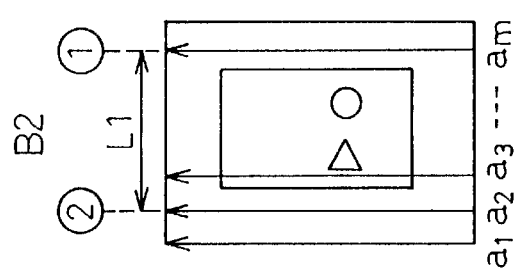
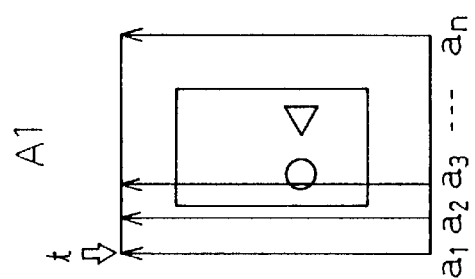

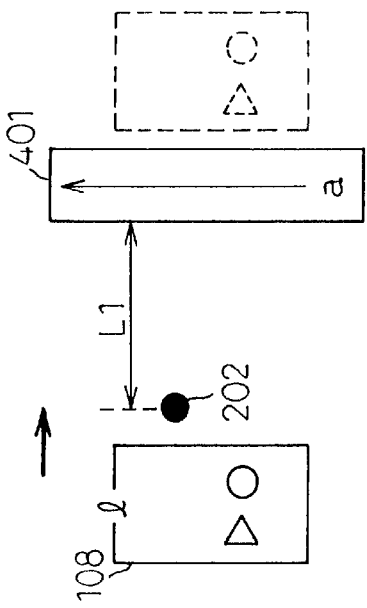
Fig.8a
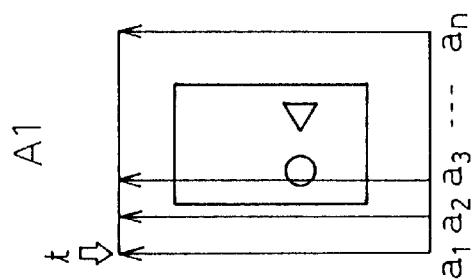
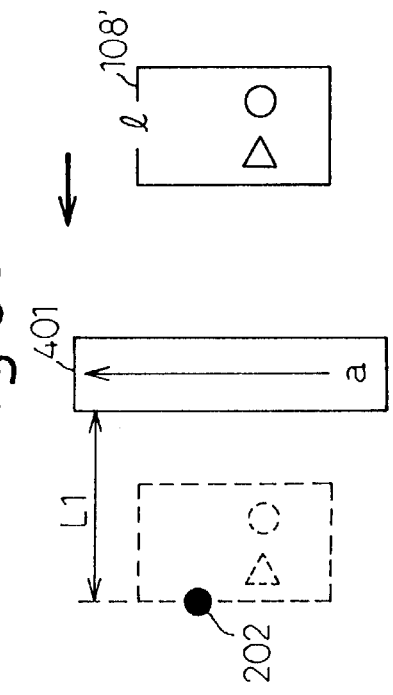
Fig.8b
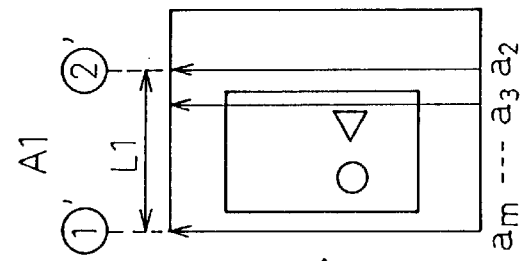
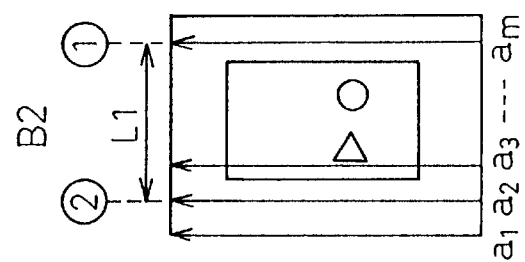

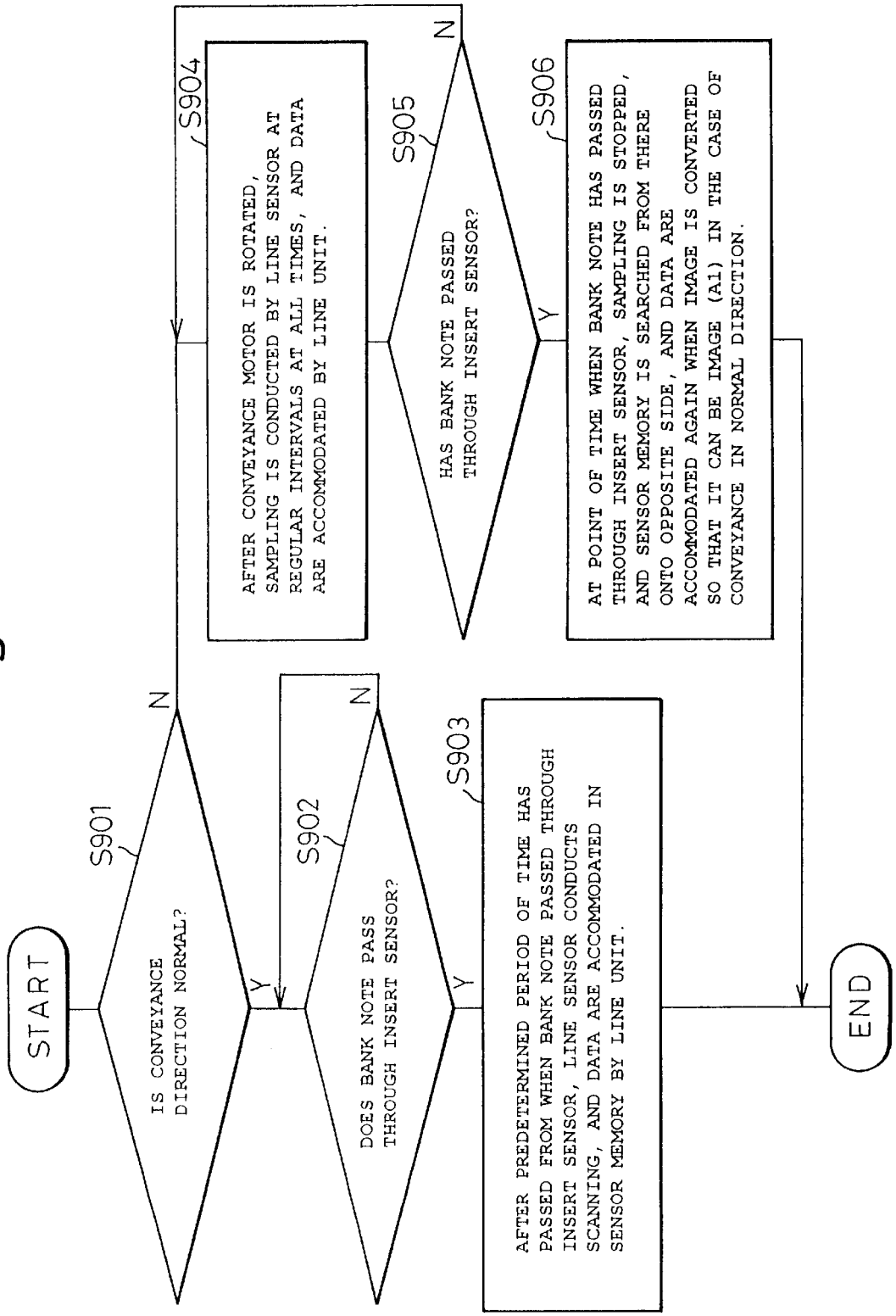

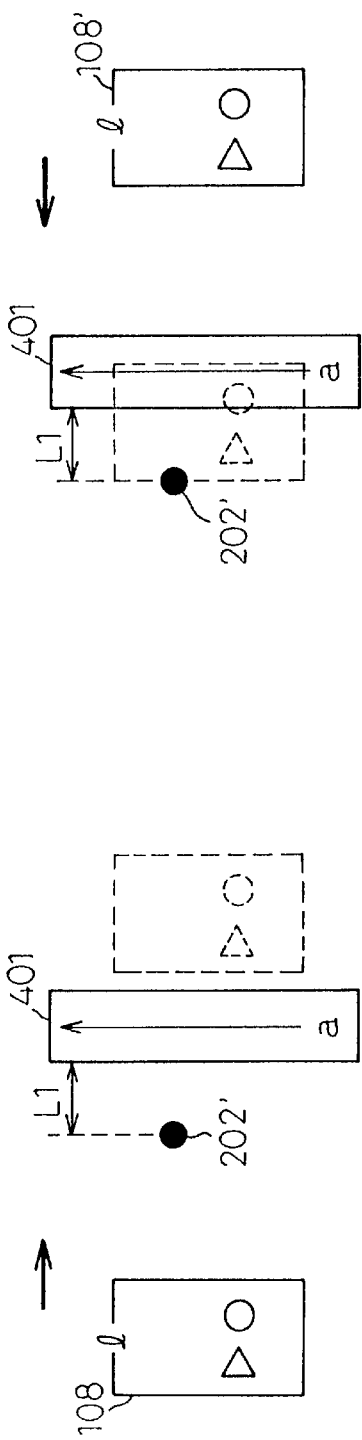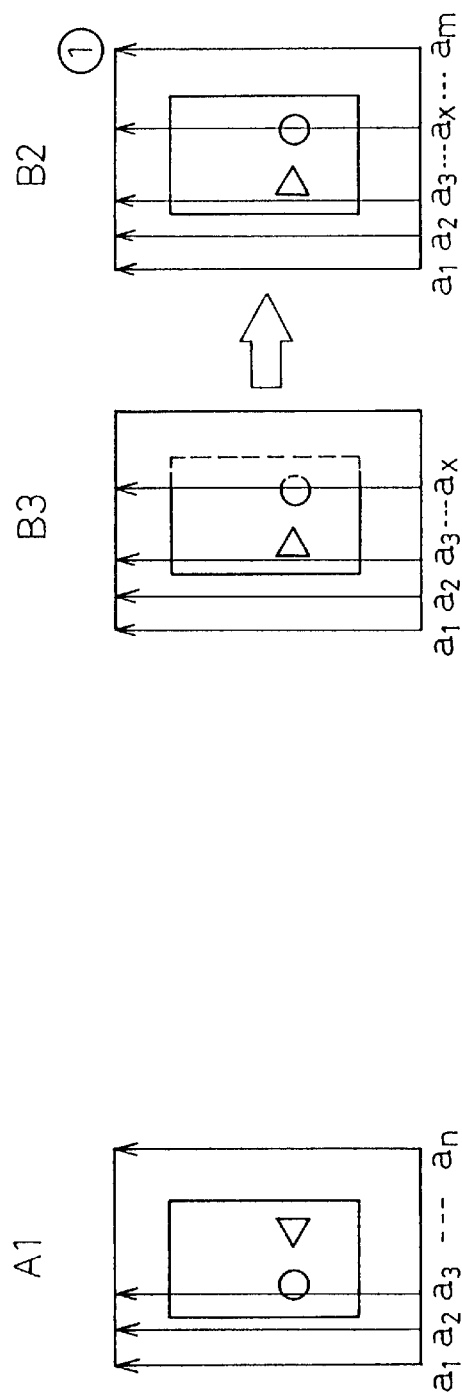

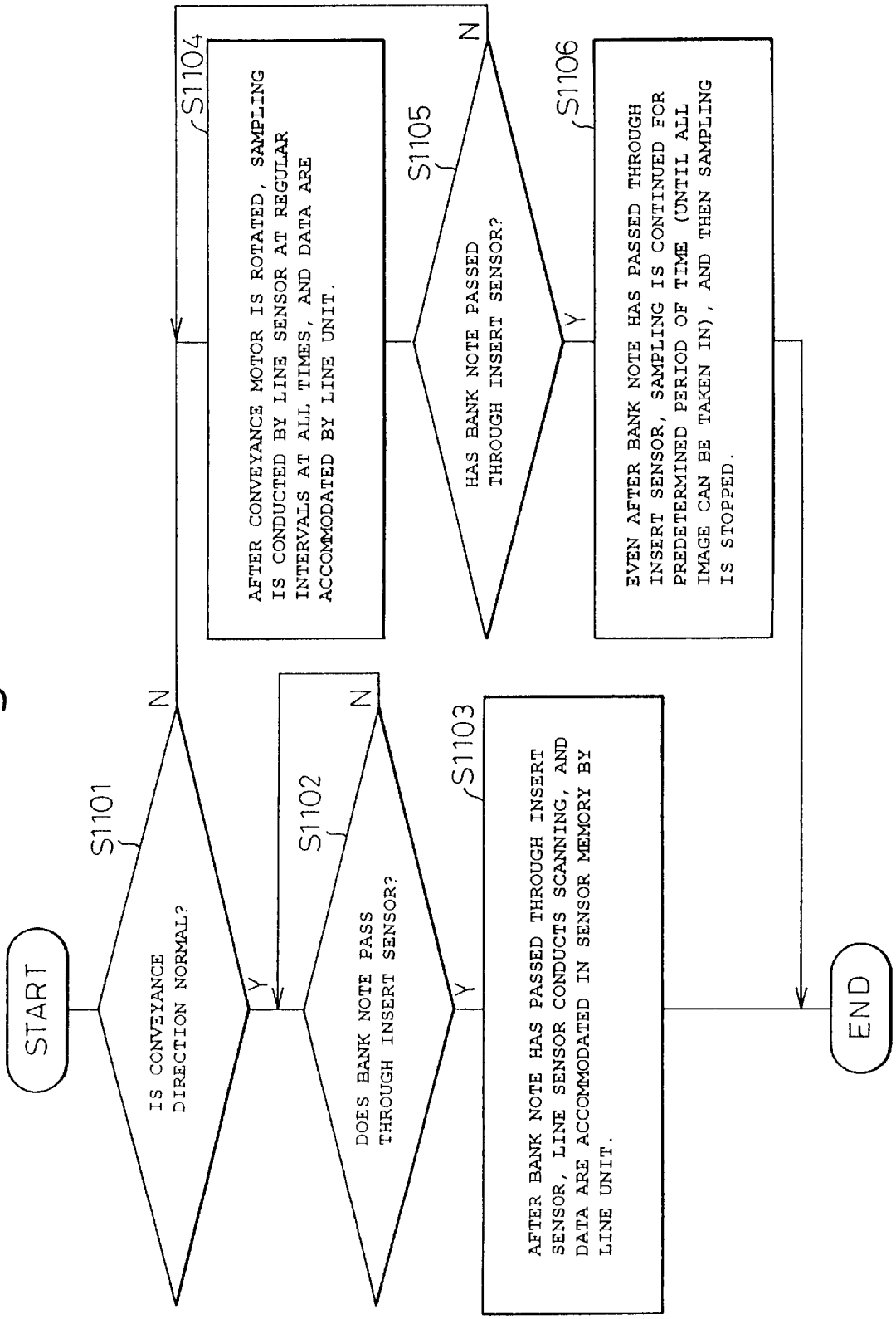

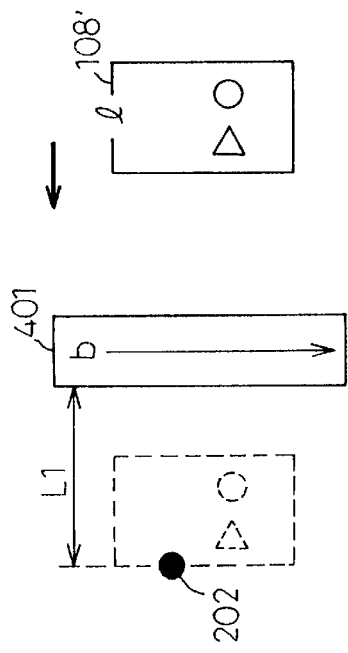
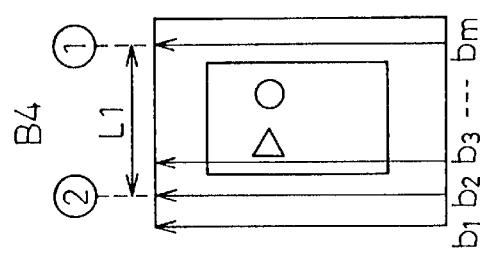
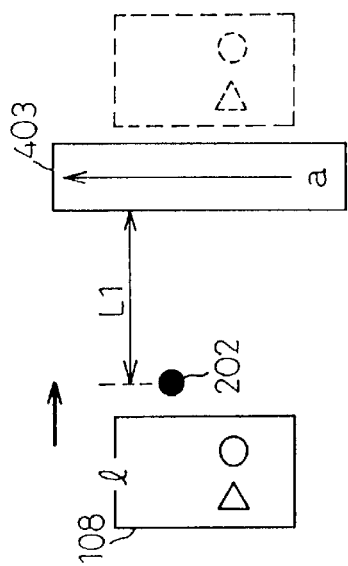
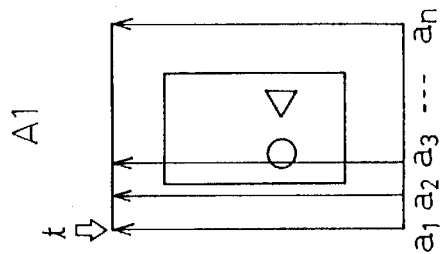
Fig.12a Fig.12b

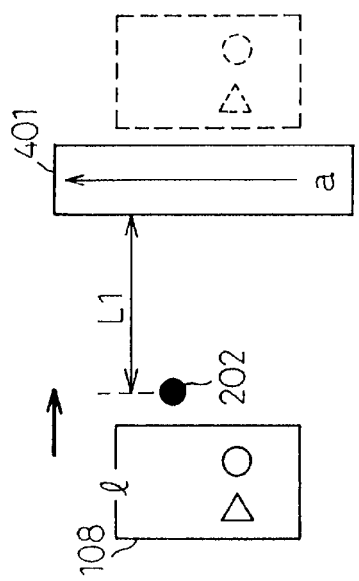
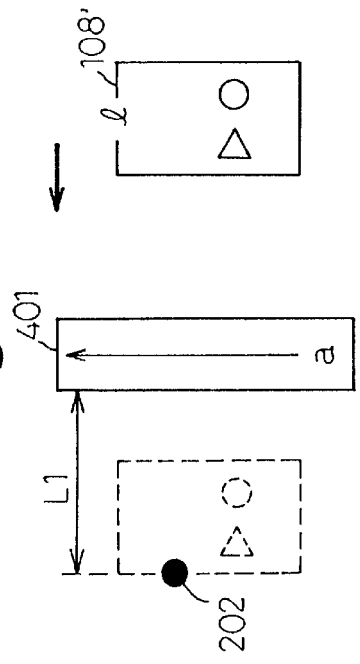
Fig.15a
Fig.15b
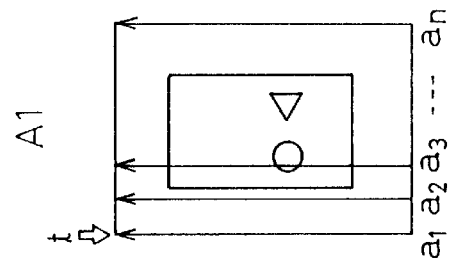
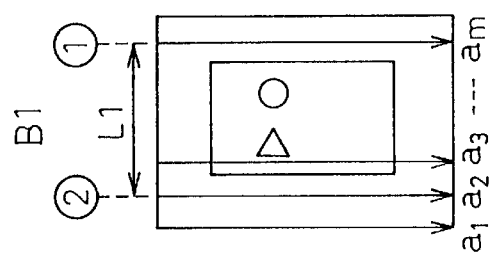

PROCESSING APPARATUS FOR DISCRIMINATING VARIOUS TYPES OF PAPER AND CONTROL METHOD OF PROCRESSING

CROSS-REFERENCE TO RELATED APPLICATION

This application is a continuation application and is based upon PCT/JP99/04217, filed on Aug. 4, 1999.

BACKGROUND OF THE INVENTION

1. Technical Field of the Invention

The present invention relates to a bidirectional processing apparatus for discriminating various types of paper capable of correctly discriminating various types of paper even if it is conveyed in either a normal or a reverse direction. Also, the present invention relates to a control method of processing therefor.

2. Description of the Prior Art

Recently, various types of apparatus for automatically processing various types of paper have been developed. For example, concerning the bank note which represents various types of paper, the automatic teller machine (ATM) has come into wide use. It is necessary for this automatic teller machine to discriminate a bank note between true and false when a user deposits his money to the automatic teller machine. Also, it is necessary for this automatic teller machine to discriminate the type of a bank note when a user draws his money from the automatic teller machine. Therefore, the processing apparatus for discriminating various types of paper, which is arranged in the automatic teller machine, is composed as follows. The entire region of various types of paper to be discriminated is divided into minute regions. The shade of color, profile and pattern of each minute region are measured by an optical sensor, magnetic sensor and thickness sensor, and the thus measured values are converted into gradation signals it is possible to discriminate the various types of paper between true and false and also it is possible to discriminate the type of the various types of paper.

In the conventional processing apparatus for discriminating various types of paper arranged in an automatic teller machine, the various types of paper is conveyed in one specific direction. Passage of the various types of paper which has just passed through an insert sensor is used as a trigger signal, and sensors to detect light, magnetism and thickness start sampling operation. Discrimination is conducted according to the thus obtained sampling data.

In the case where a user deposits his money with the automatic teller machine, the user takes predetermined steps and then puts bank notes into an input port of the automatic teller machine. Then, the automatic teller machine discriminates the bank notes between true and false and then selects the bank notes according to the types of them and stocks them in the automatic teller machine. In the case of payment, the user takes predetermined steps and then inputs a necessary amount and necessary type of money. Then the automatic teller machine selects the bank notes concerned and sends them to an output port.

When depositing and withdrawing are conducted through different routes, that is, when the bank notes are conveyed through different routes in the cases of depositing and withdrawing, it is necessary to doubly provide the apparatus including the processing apparatus for discrimination, which increases the equipment cost. When discrimination is conducted only by one set of processing apparatus for discrimination, the following problems may be encountered. In this apparatus concerned, the insert sensor to detect the passage of bank notes is arranged only on the entry side of the apparatus. Therefore, the conveyance direction of bank notes to the processing apparatus for discrimination is restricted to one direction. When consideration is given to the fact that the insert sensor becomes a trigger to start the sampling operation conducted by the sensors, it is impossible to convey the bank notes in the reverse direction as they are. For the above reasons, it is necessary to use a processing apparatus for discrimination in which bank notes can be conveyed only in one direction and the conveyance passage is provided so that they can convey bank notes in both cases of depositing and withdrawing money. However, the thus composed processing apparatus for discrimination is disadvantageous in that the bank note conveyance route is complicated and extended, which creates difficulties when the apparatus is to be downsized and the manufacturing cost is to be reduced.

In order to solve the above problems, there is provided a processing apparatus for discrimination in which the bank note conveyance route for depositing money and the bank note conveyance route for drawing money are made the same, so that bank notes can be inserted into the processing apparatus for discrimination in two directions. In this processing apparatus for discrimination, there is provided an insert sensor on the delivery side being independent from the insert sensor on the entry side, so that a trigger signal can be obtained in the case of conveyance in the reverse direction by the insert sensor arranged on the delivery side. However, this bidirectional processing apparatus for discrimination needs two sets of insert sensors, which increases the manufacturing cost, that is, it prevents reducing the price.

In the processing apparatus for discrimination arranged in the automatic teller machine, in order to discriminate bank notes between true and false and also in order to select bank notes between the types of the bank notes, the processing apparatus for discrimination has various sensors which are arranged being opposed to the bank note conveyed to the processing apparatus for discrimination. When the pattern data obtained by a transmission light sensor for optically recognizing characters and figures printed on a bank note and also the pattern data obtained by a magnetic sensor for magnetically recognizing the characters and figures printed on the bank note are compared with the corresponding pattern data on a true bank note which are previously stored in a dictionary data unit, discrimination of the bank note can be conducted. When a user puts a bank note into the processing apparatus for discrimination, the way of setting the bank note at the processing apparatus depends upon the user, that is, the direction of the bank note depends upon the user and, further, whether a front face of the bank note is set upward or a reverse face of the bank note is set upward depends upon the user. There are various ways of setting the bank note at the processing apparatus for discrimination according to the user. For example, in the case where a bank note is conveyed in the direction of the short side of the bank note, there are eight patterns of setting the bank note. Further, when consideration is given to the way of conveying the bank note in which the bank note is conveyed in the direction of the long side of the bank note, the number of the patterns is doubled. In this case, in order to discriminate the bank note conveyed by a bidirectional processing apparatus for discrimination, it is necessary for the dictionary data section to store all data patterns containing 16 data patterns. Further, it is necessary to handle a plurality of types of bank notes. Therefore, it is necessary to store all data patterns for each type bank note. For the above reasons, the dictionary data section must have a large capacity, which causes a problem.

SUMMARY OF THE INVENTION

The present invention has been accomplished to solve the above problems. It is an object of the present invention to realize a bidirectional processing apparatus for discriminating various types of paper and a control method of processing capable of reducing a memory capacity of a dictionary data section without providing an insert sensor on the delivery side.

Specifically, the present invention is described as follows. A reference pattern data in a dictionary data unit corresponding to a conveyance direction of various types of paper is made to be common to either of two directions so that a quantity of pattern data to be stored is reduced when a sampling direction of a line sensor arranged in the processing apparatus for discriminating various types of paper is appropriately determined and the sampling data obtained by the line sensor is stored in a sensor memory in an appropriate way.

In order to accomplish the object, the present invention proposes the following processing apparatus for discriminating various types of paper and a control method of processing.

According to an embodiment of the processing apparatus for discriminating various types of paper of the present invention, when passage of various types of paper is detected by the insert sensor, scanning of the line sensor is started, and the sampling data are successively stored in the sensor memory by the line unit. Then, the pattern image data, which are made from the sampling data, and the reference pattern data are compared with each other and discriminated. It is controlled that the various types of paper can be conveyed in two directions, wherein one is a normal direction (entry side) of the processing apparatus for discrimination and the other is a reverse direction (delivery side). Concerning the insert sensor unit, the insert sensor is arranged on the entry side of the processing apparatus for discrimination so that passage of the various types of paper can be detected. In the case where the various types of paper is conveyed in the normal direction, when a leading end of the various types of paper passes through the insert sensor, scanning of the line sensor is started after a predetermined period of time, and the sampling data sent from the line sensor is successively stored in the sensor memory by the line unit. The present invention provides the thus composed processing apparatus for discriminating various types of paper.

According to another embodiment of the processing apparatus for discriminating various types of paper of the present invention, in the case where the various types of paper is conveyed in a reverse direction, scanning of the line sensor is started, and the sampling data begins to be stored in the sensor memory by the line unit. When a leading end of the various types of paper passes through the insert sensor, storing of the sampling data in the sensor memory is stopped. A position returned from the storing stop position of the sensor memory by a predetermined number of lines is determined to be a reading start point, and the pattern image data, which are made from the sampling data that have been read out, and the reference pattern data are compared with each other and discriminated.

According to still another embodiment of the processing apparatus for discriminating various types of paper of the present invention, in the case where the various types of paper is conveyed in a reverse direction, scanning of the line sensor is started, and the sampling data is started to be successively stored in the sensor memory by the line unit. When a leading end of the various types of paper passes through the insert sensor, in the case where it is anticipated that all the sampling data relating to the various types of paper can not be stored, storing of the sampling data in the sensor memory is stopped when a predetermined period of time passes after the various types of paper has passed through the insert sensor. A position returned from the storing stop position of the sensor memory by a predetermined number of lines is determined to be a reading start point, and the pattern image data, which are made from the sampling data that have been read out, and the reference pattern data are compared with each other and discriminated.

According to still another embodiment of the processing apparatus for discriminating various types of paper of the present invention, in the case where the various types of paper is conveyed in a reverse direction, scanning of the line sensor is started, and the sampling data is started to be successively stored in the sensor memory by the line unit. When a leading end of the various types of paper passes through the insert sensor, storing of the sampling data in the sensor memory is stopped. Then, reading is conducted by returning from the sampling data at the storing stop position of the sensor memory, and storing is conducted again from a top position of the sensor memory. After that, this position is determined to be a reading start point, and the pattern image data, which are made from the sampling data that have been read out, and the reference pattern data, are compared with each other and discriminated.

According to still another embodiment of the processing apparatus for discriminating various types of paper of the present invention, in the case where the various types of paper is conveyed in a reverse direction, scanning of the line sensor is started in a reverse direction to the scanning direction in the case of conveyance in the normal direction, and the sampling data is successively stored in the sensor memory by the line unit. When a leading end of the various types of paper passes through the insert sensor, storing of the sampling data in the sensor memory is stopped. A position returned from the storing stop position of the sensor memory by a predetermined number of lines is determined to be a reading start point, and the pattern image data, which are made from the sampling data that have been read out, and the reference pattern data are compared with each other and discriminated.

According to still another embodiment of the processing apparatus for discriminating various types of paper of the present invention, in the case where the various types of paper is conveyed in a reverse direction, scanning of the line sensor is started, and the sampling data is successively stored in the sensor memory by the line unit in a reverse direction to the storing direction by the line unit in the case of conveyance in the normal direction. When a leading end of the various types of paper passes through the insert sensor, storing of the sampling data in the sensor memory is stopped. A position returned from the storing stop position of the sensor memory by a predetermined number of lines is determined to be a reading start point, and the pattern image data, which are made from the sampling data that have been read out, and the reference pattern data are compared with each other and discriminated.

According to still another embodiment of the processing apparatus for discriminating various types of paper of the present invention, in the case of conveyance of the various types of paper in the reverse direction, scanning is started only by the optical sensor of the line sensor, and the sampling data is successively stored in the sensor memory by the line unit.

According to still another embodiment of the processing apparatus for discriminating various types of paper of the present invention, in the case of conveyance of the various types of paper in the reverse direction, the conveyance speed of the various types of paper is controlled so that it can be lower than the conveyance speed in the normal direction.

BRIEF DESCRIPTION OF THE DRAWINGS

Other characteristics of the invention appear from the following descriptions given with reference to the accompanying drawings in which:

FIG. 1 is a schematic illustration showing an automatic teller machine including a common processing apparatus for discrimination;

FIG. 2 is a schematic illustration showing an arrangement of sensors in an automatic teller machine;

FIG. 3 is a schematic block diagram showing an outline of a processing apparatus for discrimination of the present invention;

FIGS. 6a and 6b are views for explaining a relation between a scanning direction of a line sensor and a sensor memory image in the first embodiment;

FIGS. 8a and 8b are views showing a relation between a scanning direction of a line sensor and a sensor memory image in the second embodiment;

FIG. 9 is a flow chart showing the scanning of a line sensor and image processing in the second embodiment;

FIGS. 10a and 10b are views showing a relation between a scanning direction of a line sensor and a sensor memory image in the third embodiment;

FIG. 11 is a flow chart showing the scanning of a line sensor and image processing in the third embodiment;

FIGS. 12a and 12b are views showing a relation between a scanning direction of a line sensor and a sensor memory image in the fourth embodiment;

FIGS. 15a and 15b are views showing a relation between a scanning direction of a line sensor and a sensor memory image in the fifth embodiment;

THE MOST PREFERRED EMBODIMENT

Figure 4A:
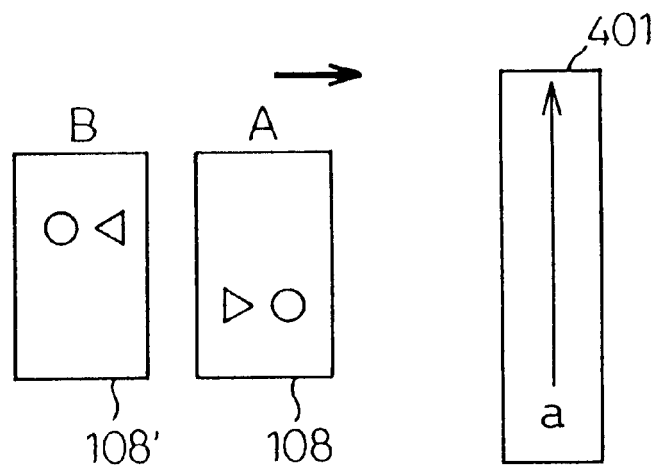
FIGS. 4a and 4b are views for explaining a relation between a bank note and a sensor memory image in the case of conveyance in the normal direction.

In order to make the effect of the present invention clear, a general processing apparatus for discriminating various types of paper relating to the present invention will be explained as follows. In this connection, explanations will be made into a case in which the following processing apparatus for discriminating various types of paper is applied to an automatic teller machine.

FIG. 1 is a view showing an outline of the automatic teller machine 101 arranged in a financial institution. The automatic teller machine 101 includes: a bank note input port 102; a processing apparatus 103 for discrimination; and stackers 104, 105, 106, 109 in which various types of bank notes are stocked being sorted. The bank note input port 102 is connected with the stackers 104, 105, 106, 109 by the conveyance passage 107 via the processing apparatus 103 for discrimination. When a user deposits his money with the automatic teller machine 101, a necessary procedure (not shown) such as a procedure of inputting data into the automatic teller machine by a debit card is conducted. Then, the bank note 108 is inserted into the bank note input port 102, and the thus inserted bank note 108 is conveyed to the processing apparatus 103 for discrimination. Whether each bank note is true or false is discriminated by the processing apparatus 103 for discrimination, and further the type of each bank note is distinguished. The bank note 108 is conveyed to each stacker 104, 105, 106 via the conveyance passage 107 being distinguished according to the type of the bank note 108. In this case, the bank note 108, which cannot be discriminated by the processing apparatus for discrimination 103, is sent to the stacker 109 and returned to the user. In the case where the user draws his money from the automatic teller machine 101, the user takes necessary steps (not shown) such as a step of inputting a bank account number, a cipher number, an amount of money to be paid and a type of money the user wants to draw out. After the user has taken the necessary steps as described above, bank notes are taken out one by one from each stacker 104, 105, 106 according to the amount and type of money the user has inputted before. The bank notes, which have been taken out from the stackers, are conveyed to the processing apparatus 103 for discrimination in the reverse direction in the same conveyance passage 107 as that of a case of depositing money. These bank notes are finally checked for discrimination before they are discharged from the automatic teller machine 101. If nothing is wrong with respect to the bank notes, they are sent to the bank note input port 102 and picked up by the user.

As described above, in the cases of depositing and withdrawing money, the processing apparatus 103 for discrimination of the automatic teller machine 101 uses the same conveyance passage. The bank note 108 passes through the processing apparatus 103 for discrimination in two directions of the normal direction (arrow→) and the reverse direction (arrow←).

Referring to FIG. 2, an arrangement of sensors in the processing apparatus 103 for discrimination, through which a bank note can pass in two directions, will be explained below. Therefore, the bank note 108 is conveyed on the conveyance passage 201 which is operated in two directions. When a view is taken from the entry side of the processing apparatus 103, that is, when a view is taken from the side on which a user deposits his money (normal conveyance direction), along the conveyance passage 201 in the processing apparatus, there are provided an insert sensor 202, optical line sensor 203, magnetic sensor 204 and thickness sensor 205 in this order, wherein these sensors are arranged being opposed to the bank note 108. Distances between the sensors are set as follows. The distance from the insert sensor 202 to the optical line sensor 203 is L1, the distance from the insert sensor 202 to the magnetic sensor 204 is L2, and further the distance from the insert sensor 202 to the thickness sensor 205 is L3. Each distance is set at an appropriate interval by which detection data can be processed after the bank note 108 is inserted to the processing apparatus 103 for discrimination. In the conventional bidirectional processing apparatus for discrimination, the insert sensor is also arranged on the delivery side, that is, the insert sensor is also arranged on the side on which a bank note is conveyed in the case where a user withdraws his money (reverse conveying direction).

The insert sensor 202 is a sensor to detect an arrival of the bank note 108 at the processing apparatus 103 for discrimination. This insert sensor 202 gives a trigger signal to start the discrimination processing. The optical line sensor 203 conducts scanning on the bank note 108 in the direction perpendicular to the conveyance direction of the bank note 108, so that the data to detect characters and figures, which are printed on the bank note, by the transmission of light, can be generated. The magnetic sensor 204 generates data which are made when the characters and figures printed on the bank note with magnetic ink are magnetically detected. The thickness sensor 205 detects a lap portion in which a plurality of sheets of paper lap on each other. Also, the thickness sensor 205 detects a bent portion of sheets of paper and checks whether or not sheets of paper are correctly conveyed.

Next, referring to the arrangement shown in FIG. 3, explanations will be made into a specific operation in which the processing apparatus 103 for discrimination, having the above sensors, discriminates the bank note 108.

The processing apparatus 103 for discrimination includes: a central processor 301 for controlling the entire apparatus; and sensors of the insert sensor unit 302, sensor unit 303, and sensor memory 306. In order to conduct discrimination processing, the processing apparatus 103 for discrimination includes: a dictionary data unit 310; a dictionary comparison unit 308; and an image processing unit 307. The processing apparatus 103 for discrimination also includes a memory unit 309 for storing the result of discrimination. Further, the processing apparatus 103 for discrimination includes a conveyance speed setting unit 311 for controlling the conveyance motor 312 to drive the conveyance passage 201. The sensor unit 303 includes: an optical line sensor 203; a magnetic sensor 204; and a thickness sensor 205.

The operation of the processing apparatus 103 for discrimination having the above structure, which is incorporated into the automatic teller machine 101, will be explained below.

When a user is going to deposit his money, he inserts bank notes into the bank note input port 102. Then, the central processor 301 detects that it is in a money depositing mode, and controls the conveyance motor 312 so that the bank note conveyance direction of the conveyance passage 201 can be a normal direction. The conveyance motor 312 drives the conveyance passage 201 at a speed which has been set by the conveyance speed setting unit 311. The bank note 108 is conveyed to the processing apparatus 103 for discrimination and arrives at the insert sensor 202 arranged on the entry side, that is, on the normal direction side. Then, the central processor 301 detects that the bank note has moved into the insert sensor 302 by a signal sent from the insert sensor unit 302. This detection is used as a trigger of start of discrimination processing. Each sensor in the sensor unit 303 is started by control of the central processor 301, and the operation of data sampling is started.

When the bank note 108 is conveyed into the apparatus, the sensor unit 303 generates a data sampling analog signal corresponding to each sensor. After the analog signal has been appropriately amplified by the amplifying unit 304, it is sent to the A/D conversion unit 305. Data sampling is conducted by a necessary number of times according to the conveyance speed of the bank note by control of the central processor 301. The A/D conversion unit 305 converts the analog signal into a digital signal so that the signal can be stored in the sensor memory 306. The sensor memory 306 is provided with storing regions respectively corresponding to the sampling data sent from the optical line sensor 203, magnetic sensor 204 and thickness sensor 205. Digital data obtained by the A/D conversion section 305 are successively stored by the line unit of scanning.

After the sampling data obtained by the sensor unit 303 have been stored in the sensor memory 306, the central processor 301 reads out the sampling data stored in the sensor memory 306 and sends the data to the image processing unit 307. In the image processing unit 307, the sampling data are subjected to various image processings such as coordinate conversion (inclination correction) and density correction so that an image pattern appropriate for discrimination can be obtained. In this way, the pattern image data can be made. The dictionary data unit 310 stores reference pattern data with respect to the image pattern of a true bank note corresponding to the conveyance direction of the bank note for each type of bank note.

Then, the central processor 301 controls the dictionary comparison unit 308 so that the pattern image data obtained by the image processing unit 307 and the reference pattern data stored in the dictionary data unit 310 can be compared with each other and discriminated. When the conveyed bank note is judged to be a true bank note as a result of the discrimination, the memory unit 309 stores the result of judgment in which true or false has been judged, and the bank note 108 is accommodated in each stacker 104 to 106 according to the type of the bank note. However, if the bank note is rejected as a result of the discrimination, the bank note is once accommodated in the reject stacker 109. Then, the central processor 301 controls the conveyance motor 312, and the bank note concerned is conveyed from the stacker 109 to the bank note input port 102 and returned to the user.

In the case where the user withdraws his money from the automatic teller machine 101, first, the user takes a predetermined procedure for withdrawing his money from the automatic teller machine 101. Then, the central processor 301 detects that it is in a money withdrawing mode, and controls the conveyance motor 312 so that it can be rotated in a conveyance direction reverse to that of the money depositing mode. In this way, the conveyance passage 107 is driven in the direction from each stacker 104 to 106 to the processing apparatus 103 for discrimination. According to the type of the bank note designated by the user, the bank notes are taken out from each stacker 104 to 106 one by one and conveyed into the processing apparatus 103 for discrimination in the reverse direction, that is, the bank notes are conveyed into the processing apparatus 103 for discrimination from the delivery side.

When the bank note is conveyed into the processing apparatus 103 for discrimination in the reverse direction, since the insert sensor is also arranged on the delivery side of the processing apparatus 103 for discrimination, the central processor 301 can detect that the bank note has been conveyed to the processing apparatus 103 for discrimination. Then, the central processor 301 starts the sensor unit 303. When the bank note is conveyed to the sensor unit 303, the sensor unit 303 conducts data sampling by a necessary number of times of scanning. The thus obtained sampling data are stored in the sensor memory 306 by the unit of a scanned line.

Discrimination processing is conducted in the same manner as that of the money depositing mode after the sampling data with respect to the bank note concerned have been stored. When the central processor 301 has discriminated that the type of the bank note is the same as the designated one, the conveyance motor 312 is controlled so that the necessary bank notes can be discharged into the bank note input port 102.

Next, referring to FIGS. 4 and 5, explanations will be made into a relation between the sampling operation, which is conducted by the sensor unit 303 when the bank note is conveyed to the processing apparatus 103 for discrimination in the normal or reverse direction, and the image stored in the sensor memory 306.

Figure 4B:
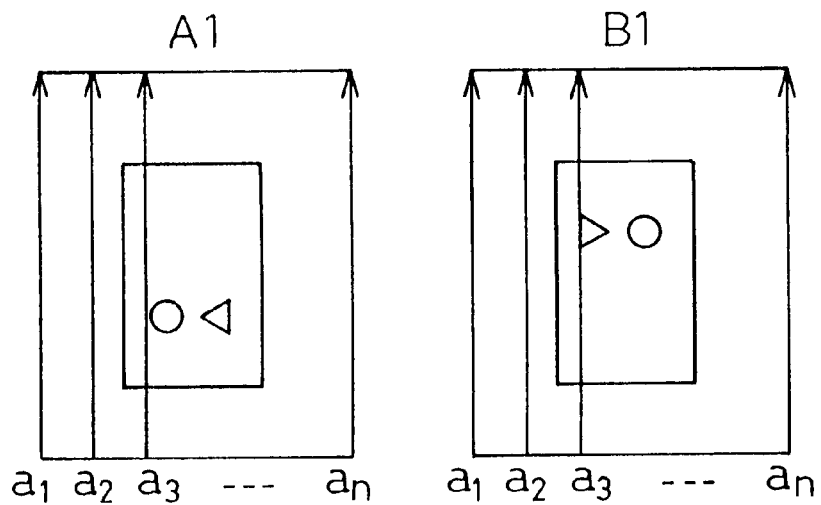

FIG. 4 is a view showing a model of a case in which the bank note is conveyed to the processing apparatus 103 for discrimination in the normal direction. FIG. 4*a* is a view showing a relation between the leading direction "a" (arrow↑) of the line sensor 401 and the conveyance direction (arrow→) of the bank notes 108, 108'. FIG. 4*b* is an image view of the sensor memory in which a state of storing the sampling data of the sensor memory 306 in the case where the bank note passes once through the line sensor 401 is expressed by a visual image. In the view, direction "A" is a conveyance direction of the bank note 108, which is a case in which the bank note is conveyed while an upper side of the bank note, the head of which is set upward, is directed to the line sensor 401. On the contrary, direction "B" is a conveyance direction of the bank note 108, which is a case in which the bank note is conveyed while a lower side of the bank note, the head of which is set upward, is directed to the line sensor 401.

The line sensor 401 conducts sampling in the direction of sensor lead "a" (arrow↑) by the line unit. When data sampling is conducted on the bank note 108, which is conveyed in direction A, or the bank note 108' which is conveyed in direction B by the line sensor 401, the sampling data are successively stored in the sensor memory 306. A sensor memory image of the sampling data at this time is visually shown in FIG. 4*b* as an image obtained by the passage of one time. Each time the bank note 108 or 108' passes once through the line sensor, the sampling data $a_1$, $a_2$, . . . $a_n$ for each line are stored in the sensor memory 306 by the line unit in the order of arrow $a_1$ to arrow $a_n$ as shown in FIG. 4*b*.

Therefore, sensor memory image A1 with respect to the bank note conveyed in direction A is located symmetrically to the bank note 108 with respect to the scanning direction "a" of the line sensor 403.

In the case of the bank note 108' conveyed in direction B, sensor memory image B1 shown in FIG. 4*b* is stored in the sensor memory 306. Then, in order to discriminate the bank note 108 conveyed in direction A or the bank note 108' conveyed in direction B, the data of a true bank note corresponding to memory images A1 and B1 must be previously stored in the dictionary data unit 310.

Figure 5A:
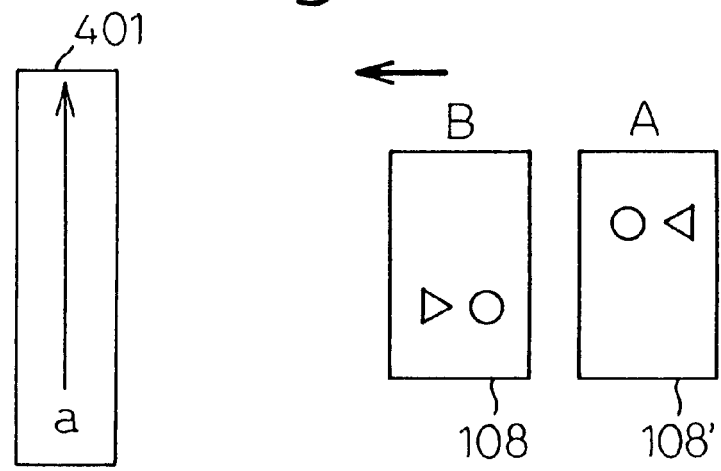
FIGS. 5a and 5b are views for explaining a relation between a bank note and a sensor memory image in the case of conveyance in the reverse direction.
Figure 5B:
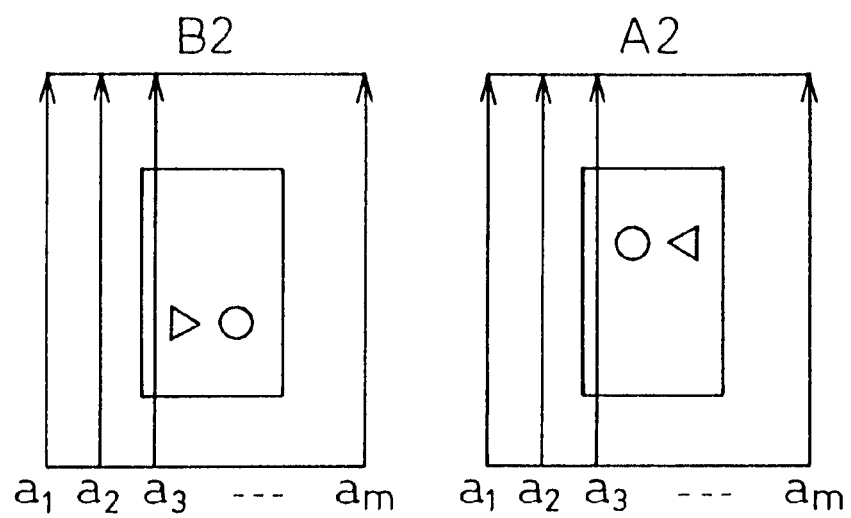

FIG. 5 is a view showing a model of a case in the same manner as that of FIG. 4 in which the bank note is conveyed to the processing apparatus 103 for discrimination in the reverse direction (arrow←). FIG. 5*a* is a view showing a relation between the leading direction "a" (arrow↑) of the line sensor 410 and the conveyance direction (arrow←) of the bank notes 108, 108'. FIG. 5*b* is an image view of the sensor memory in which a state of storing the sampling data of the sensor memory 306 in the case where the bank note passes once through the line sensor 401 is expressed by a visual image. The line sensor 401 conducts sampling in the direction of sensor lead "a" (arrow↑). In the same manner as that of conveyance in the normal direction shown in FIG. 4, the sampling data $a_1$, $a_2$, . . . $a_n$ are stored in the sensor memory 306 by the line unit in the order of arrows $a_1$ to arrow $a_n$.

When the stored image of these sampling data is viewed as an image, as shown in FIG. 5*b*, sensor memory images A2 and B2 are obtained with respect to the bank note 108 conveyed in direction A and the bank note 108' conveyed in direction B. In this case, a positional relation of an image of the sensor memory image A2 with respect to the bank note 108 conveyed in the direction A is the same as that of the image of the bank note 108 which has been conveyed. Accordingly, as shown in FIG. 5*b*, the sensor memory images A2 and B2 are different from the sensor memory images A1 and B1 in the case of conveyance in the normal direction shown in FIG. 4*b*. Therefore, in order to discriminate the bank note 108 conveyed in the direction A and the bank note 108' conveyed in the direction B, reference pattern data of a true bank note corresponding to the memory images in the directions A and B must be previously stored in the dictionary data unit 310.

Whatever the state of the bank note may be, the processing apparatus 103 for discrimination must discriminate the bank note between true and false. The sensor images shown in FIGS. 4 and 5 are images obtained when the bank note is conveyed in such a manner that the bank note is set so that the head of the bank note is directed upward and the long side of the bank note is arranged in parallel with the sensor. In this case, there are provided four patterns of A1, B1, A2 and B2. In this case, the image in the direction A and the image in the direction B are symmetrical to each other, however, when data are stored in the sensor memory 306, the image in the direction A and the image in the direction B are completely different from each other. When the bank note is discriminated between true and false whatever the state of the bank note to be conveyed may be, the above four patterns are required for the tail of the bank note. Therefore, it is necessary to prepare eight patterns with respect to the head and tail of the bank note. Further, when the bank note is conveyed while the short side of the bank note is arranged in parallel with the sensor, the above eight patterns are further required. As a result, 16 patterns in total are required. When the bank note is discriminated between true and false in all conditions, it is necessary to store 16 reference data patterns of the true bank note in the dictionary data unit 310 with respect to one type of bank note. Further, the 16 reference data patterns of the true bank note must be stored in the dictionary data unit 310 with respect to each type of bank note to be handled. Therefore, it is necessary to prepare a very large capacity memory in the dictionary data unit 310.

In order to accomplish an object of reducing a quantity of reference pattern data, according to the present invention, when the sensor leading direction of the line sensor and the writing and reading procedure of the sensor memory of the sampling data obtained by the line sensor are devised, the reference pattern data of the true bank note stored in the dictionary data section can be used in the above patterns in common, so that the quantity of pattern data of the true bank note to be stored in the dictionary data section is reduced. Due to the foregoing, the memory capacity can be greatly reduced. Even when the insert sensor is not arranged on the delivery side of the processing apparatus for discrimination, the memory capacity can be reduced by the device described above.

Preferred embodiments of the present invention will be explained below.

First Embodiment

Sensors are arranged in the processing apparatus 103 for discrimination as shown in FIG. 2. The insert sensor 202 is arranged only on the entry side of the processing apparatus 103 for discrimination. The bank note 108 is conveyed to the processing apparatus 103 for discrimination by the conveyance passage 202 in two directions, wherein one is a normal direction and the other is a reverse direction.

In the first embodiment, when the bank note is conveyed in the reverse direction, the line sensor conducts sampling at all times. At the point of time when a leading end of the bank note passes through the insert sensor 202, data sampling of the line sensor is stopped. When a position returned from the stopping point by a distance between the insert sensor and the line sensor is determined to be a cutting point of the sensor memory, the stored pattern data are made to be used in common.

Referring to FIG. 6, the sensor memory image will be specifically explained in the case of conveyance in the normal direction and also in the case of conveyance in the negative direction in the same manner as that shown in FIG. 4b or 5b. In FIG. 6, there is shown a case in which distance L1 between the line sensor 401 and the insert sensor 202 is longer than the width "1" of the bank note 108 in the conveyance direction. FIG. 6a is a view showing a case in which the bank note is conveyed in the normal direction, and FIG. 6b is a view showing a case in which the bank note is conveyed in the reverse direction. In this connection, in the drawing, dotted lines show a position of the bank note that has passed through the line sensor.

In the case where the bank note 108 is conveyed in the normal direction (arrow→), when a leading end of the bank note 108 passes through the insert sensor 202, the insert sensor unit 302 transmits a signal of detection of the bank note 108, which has moved into the insert sensor 202, to the central processor 301. At this time, the central processor 301 makes the line sensor 401 start scanning (arrow "a"↑) and directs the line sensor 401 to start data sampling. However, if data sampling is started at the point of time when the bank note 108 has arrived at the insert sensor 202, no bank note 108 exists until a leading end of the bank note 108 arrives at the line sensor 401. Therefore, the line sensor 401 cannot read any data until the leading end of the bank note 108 arrives at the line sensor 401. That is, no sampling data of the bank note 108 exists, and waste sampling data corresponding to distance L1 are stored in the sensor memory 306. In order to prevent the occurrence of the above problems, the central processor 301 gives consideration into the conveyance speed of the bank note 108, and reference is made by the central processor 301 to distance L1, intervals of sampling ($a_1, a_2, \ldots a_n$) and the capacity of the sensor memory 306, the central processor 301 determines a predetermined period of time in which the bank note can be correctly accommodated at the center of the sensor memory 306 even if the bank note is affected by disturbance such as skew conveyance and breakage of the bank note. Data sampling of the line sensor 401 is started at the time t after a predetermined period of time has passed from the point of time when the bank note 108 passes through the insert sensor 202. Alternatively, data sampling of the line sensor 401 is not started but the start of storing data in the sensor memory 306 may be delayed. That is, data sampling is conducted while the line sensor 401 is reading waste data from the point of time when the leading end of the bank note 108 passes through the insert sensor 202, and sampling data after the time "t", which is the time after the predetermined period of time has passed from the point of time, may be stored in the sensor memory 306.

The scanning direction of the line sensor 401 is the leading direction "a" of arrow (↑), and sampling data $a_1, a_2, \ldots a_n$, which have been read out by the line unit in the leading direction "a", are stored in the sensor memory 306 from the position of the time "t" in the order from arrow $a_1$ to arrow $a_n$. In FIG. 6a, there is shown an sensor memory image A1 of sampling data stored in the sensor memory 306 after the bank note 108 passes through the line sensor 401. In this connection, this sensor memory image A1 of sampling data is the same as sensor memory image A1 corresponding to the bank note 108 conveyed in direction A in FIG. 4. The thus stored sampling data are read out in the order of $a_1, a_2, \ldots, a_n$, and pattern image data are made. Next, when the thus obtained pattern image data and the reference pattern data of a true bank note stored in the dictionary data section 310 are compared with each other, the bank note 108 can be discriminated between true and false.

Next, referring to FIG. 6b, explanations will be made into a case in which the bank note is conveyed in the processing apparatus 103 for discrimination in the reverse direction.

The line sensor 401 conducts scanning in the leading direction "a" in the same manner as that of the case in which the bank note is conveyed in the normal direction. Since the insert sensor 202 is not arranged on the delivery side of the processing apparatus 103 for discrimination, even when the bank note 108' has been conveyed, it is impossible for the processing apparatus 103 for discrimination to detect the arrival of the bank note 108'. Therefore, the central processor 301 detects that it is a payment mode, and the conveyance motor 312 is driven in the reverse conveyance direction (arrow←). At the same time, the central processor 301 directs the line sensor 410 to start scanning so that sampling can be conducted whenever the bank note 108 passes through the processing apparatus 103 for discrimination. In this connection, data sampling is conducted so that data can be surely stored in the sensor memory when the bank note 108' passes once through the line sensor 401. The interval of sampling is, for example, once per 1 mm. However, until the bank note 108' arrives at the line sensor 401, no object of sampling exists. Therefore, waste sampling, as described before, is conducted. In sensor memory image B2 shown in FIG. 6b, sampling data $a_1, a_2, \ldots, a_m$ are obtained by waste sampling.

In this case, the sensor memory 306 is composed of a ring structure in which the address is automatically returned to when it comes to an end of the area so that storing is continued by the line unit. In this case, when the bank note 108' passes through the line sensor 401, since the line sensor 401 is conducting sampling at the above intervals, the sampling data of the bank note 108' are stored from any position of the sensor memory 306. In FIG. 6b, there is shown sensor memory image B2 with respect to the sampling data $a_1, a_2, \ldots a_m$ stored in the sensor memory 306 until a point of time when a leading end of the bank note 108' arrives at the insert sensor 202 (until a point of time when the bank note arrives at a position expressed by dotted line). In this case, arrow $a_m$ shows sampling data at the position (1) (final storing position) on the sensor memory image at the point of time when the leading end of the bank note 108' passes through the insert sensor. In this case, distance L1 between the line sensor 401 and the insert sensor is longer than the width "1" of the bank note 601 in the conveyance direction. Therefore, when the leading end of the bank note 108' arrives at the insert sensor 202, the line sensor 401 has surely completed sampling on the entire face of the bank note 108'. Therefore, at the point of time when the leading end of the bank note 108' has passed through the insert sensor 202, storing of the sampling data may be stopped.

However, as shown in the sensor memory image B2, the storing sampling data has waste sampling data ($a_1, a_2$) before sampling data ($a_3, \ldots$) are stored. Therefore, it is impossible to know a cutting point for reading sampling data so as to make pattern image data. Therefore, while utilizing that distance L1 is longer than width "1" of the bank note 108', the central processor 301 calculates the number of lines corresponding to distance L1, and it goes back from the final storing position (1) by the thus calculated number of lines so that the position (2) in the drawing is made to be a cutting point, and sampling data from $a_2$ to $a_m$ are read out in order and transmitted to the image processing unit 307. After that, in the same manner as that of conveyance in the normal direction, the image processing unit 307 makes pattern image data for discrimination by the sampling data read out from the sensor memory 306. In this case, there is a possibility that sampling data of the bank note 108' are accommodated from a rear end to a front end of the sensor memory of the ring structure, however, when consideration is given to it in the case of reading the memory, no problems are caused.

According to the processing in the case of conveyance of the bank note in the reverse direction shown in FIG. 6b, even if no insert sensor is arranged on the delivery side of the processing apparatus for discrimination, processing for discrimination can be realized even when the bank note is conveyed in two directions.

In this connection, in the case shown in FIG. 6b, the cutting point of sampling data is the position (2). Therefore, the sensor memory image is the same as the sensor memory image B2 shown in FIG. 5b. However, when the cutting point of sampling data is changed, the reference pattern data of the dictionary data section can be made to be used in common.

In FIG. 6b, the cutting point of sampling data is made to be the point (1), and with respect to the data corresponding to the number of lines of distance L1 in the sampling data $a_1, a_2, \ldots a_m$, data from the arrow $a_m$ at the position (1) to the arrow $a_2$ at the position (2) are read out in order. Due to the foregoing, the sensor memory image B2 in the case of conveyance in the reverse direction shown in FIG. 6b is converted into the same image as the sensor memory image A1 in the case of conveyance in the normal direction shown in FIG. 6a. Therefore, pattern data stored in the dictionary data unit 310 can be used in common in the two directions.

Figure 7:
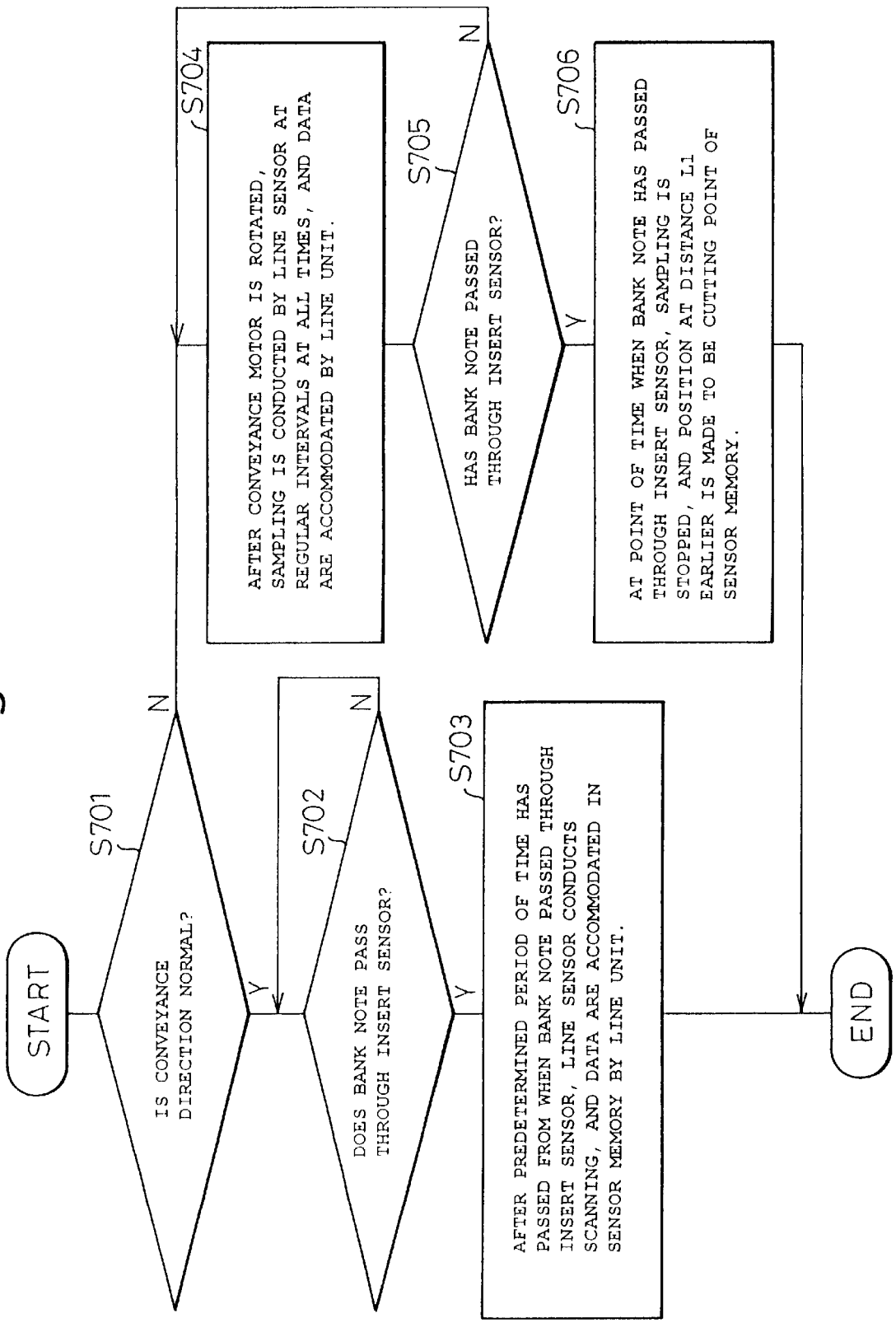
FIG. 7 is a flow chart showing the scanning of a line sensor and image processing in the first embodiment.

Next, referring to the flow chart shown in FIG. 7, operation of processing for discrimination of the processing apparatus 103 for discrimination of the first embodiment will be explained below.

When a user starts operation of the automatic teller machine, the central processor 301 of the processing apparatus 103 for discrimination detects whether the conveyance direction is normal or reverse according to whether it is a money depositing mode or money withdrawing mode. When it is a money depositing mode and the central processor 301 judges that the conveyance direction of the bank note is normal (S701), the conveyance motor 312 is driven in the normal direction.

Next, the central processor 301 detects by the insert sensor unit 302 whether or not a leading end of the bank note 108 has passed through the insert sensor 202 (S702). When the leading end of the bank note 108 has not passed through the insert sensor 202 (N), the insert sensor 302 continues to monitor the passage of the bank note.

When it is detected that the bank note 108 has passed through the insert sensor 202 (Y), the central processor 301 makes the line sensor 401 start scanning so that data sampling can be conducted at the time "t" after a predetermined period of time has passed from a point of time when the leading end of the bank note 108 passed through the insert sensor 202. When the bank note 108 passes through the line sensor 401, the line sensor 401 conducts scanning on the bank note and generates sampling data. After the sampling data have been converted by A/D conversion, they are stored in the sensor memory 306 by the line unit (S703).

On the other hand, in step S701, when the conveyance direction of the bank note is reverse (N), it is in a payment mode. Therefore, the central processor 301 drives the conveyance motor 312 so that the conveyance direction can be reversed. Then, scanning is started at intervals by which sampling can be surely conducted while the bank note passes once. Sampling data obtained by scanning conducted by the line sensor 401 are stored in the sensor memory 306 by the line unit (S704).

Next, the central processor 301 monitors whether or not the bank note, which has passed through the line sensor 401, passes through the insert sensor 202 (S705).

When no bank note passes (N), the program returns to step S704, and the line sensor 401 continues scanning at the above intervals. In this case, when the bank note 108 passes through the line sensor 401 and a leading end of the bank note 108 arrives at the insert sensor 202, the central processor 301 stops scanning of the line sensor 401 at a point of time when the bank note 108' arrives at the insert sensor 202. Then, the position (2) returned by the distance L1 from a point of time when the leading end of the bank note passes through the insert sensor 202 is determined to be a start point of the sensor memory 306. This point is made to be a cutting point for making pattern image data (S706).

In step S706, the cutting point of sampling data is the position (2) which is returned by the distance L1. However, it is also possible to make the position (1) to be a cutting position of sampling data. In this case, concerning the sampling data $a_1, a_2, \ldots a_m$, sampling data from sampling data $a_m$ at the position (1) to sampling data $a_2$ corresponding to the number of lines of the distance L1 are read out, the same image as the sensor memory image A1 shown in FIG. 6b is obtained.

As described above, when the cutting point for making the pattern image data in the sensor memory is selected, image processing is conducted. Therefore, an image obtained by the image processing becomes the same as the sensor memory image in the case of conveyance in the normal direction, and the reference pattern data in the dictionary data section can be simplified, and the bidirectional processing for discrimination can be realized without arranging the insert sensor on the delivery side of the processing apparatus 103 for discrimination.

Second Embodiment

In the second embodiment, each sensor of the processing apparatus 103 for discrimination is arranged as shown in FIG. 2. The insert sensor 202 is arranged only on the entry side of the processing apparatus 103 for discrimination, and the bank note 108 is conveyed in the conveyance passage 201 in the two directions of the normal and the reverse direction.

In the first embodiment described before, operation is conducted as follows. In the case of conveying the bank note in the reverse direction, at a point of time when a leading end of the bank note passes through the insert sensor 202, data sampling by the line sensor is stopped. A storing position of the sensor memory 306 at the point of time of stoppage is made to be a cutting point, and sampling data from the cutting point to a position returned from the cutting point by a distance between the insert sensor and the line sensor are read out. However, in the second embodiment, operation is conducted as follows. When sampling data in the case of conveyance in the reverse direction are stored in the sensor memory, the reference pattern data and the pattern data in the case of conveyance in the normal direction are made to be used in common with each other by converting and storing again the obtained sampling data.

Referring to FIG. 8, explanations will be made into the sensor memory image in the second embodiment of the invention in the case of conveyance in the normal direction and also in the case of conveyance the reverse direction. FIG. 8a is a view showing a case in which the bank note is conveyed in the normal direction, and FIG. 8b is the view showing a case in which the bank note is conveyed in the reverse direction.

FIG. 8a is a view showing a case in which the bank note 108 is conveyed in the normal direction (arrow→), which is the same as the case shown in FIG. 6a in which the bank note is conveyed in the normal direction in the first embodiment. Therefore, explanations of this case will be omitted here.

On the other hand, referring to FIG. 8b, the characteristic of the second embodiment will be explained below in the case where the bank note is conveyed to the processing apparatus 103 for discrimination in the reverse direction arrow←). In this case, the bank note 108' passes through the line sensor 401 and data sampling is conducted on the bank note 108', and when a leading end of the bank note 108' arrives at the insert sensor 202, data sampling conducted by the line sensor 401 is stopped, and the position (2) in the drawing is determined to be a cutting point when the number of lines corresponding to the distance L1 is counted back. The above operation is the same as that of the first embodiment shown in FIG. 6b.

A state of storing the sampling data $a_1, a_2, \ldots, a_m$ at a point of time when data sampling conducted by the line sensor 401 is stopped is shown in FIG. 8b as the sensor memory image B2. However, as described before, when the position (2) is made to be a cutting point of the pattern image data on the sensor memory image B2, it becomes symmetric to the sensor memory image A1 in the case of conveyance in the normal direction. Therefore, it is impossible for the storing pattern data to be used in common between them.

Therefore, in the second embodiment, before the sampling data are subjected to image processing, they are converted in the order of storing data so that they can be the same as the sampling data obtained in the case of conveyance in the normal direction. That is, with respect to the sampling data $a_1, a_2, \ldots, a_m$ which are once stored in a buffer region of the sensor memory, sampling data from sampling data $a_m$ which are stored at the position (1) shown in FIG. 8b to the sampling data $a_2$ which are stored at the position (2) are successively read out by the line unit, wherein the number of lines corresponding to the distance L1 is counted back. When the sampling data, which are read out in the order from (1) to (2) are stored in the same order in the direction from (1)' to (2)', the same image as the sensor memory image A1 can be obtained. As a result, the sensor memory image of the sampling data obtained by the line sensor 401 in the case of conveyance in the reverse direction becomes the same as the sensor memory image A1 in the case of conveyance in the normal direction shown in FIG. 8a. In this connection, it is possible to adjust the bank note image so that it can be located at the center in the case of converting the sampling data.

After the sampling data have been converted as described above, in the same manner as that of the case of conveyance in the normal direction, the position (1)' of the sensor memory 306 is made to be a cutting point for making the pattern image data, and the heads of the sampling data, which are stored again, that is, the sampling data from $a_m$ to $a_2$ are successively read out by the line unit. After image processing is conducted on the sampling data, they are compared with the reference pattern of a true bank note stored in the dictionary data unit 310, so that the bank note 801 can be discriminated between true and false.

Next, referring to the flow chart shown in FIG. 9, operation of processing for discrimination of the processing apparatus 103 for discrimination of the second embodiment will be explained below.

When a user starts operation of the automatic teller machine, the central processor 301 of the processing apparatus 103 for discrimination detects whether the conveyance direction is normal or reverse according to whether it is in a money depositing mode or money withdrawing mode. When it is in a money depositing mode and the central processor 301 judges that the conveyance direction of the bank note is normal (S901), the conveyance motor 312 is driven in the normal direction.

In this case, when the bank note 108 is conveyed in the normal direction, steps from S901 to S903 are the same as those of the first embodiment.

On the other hand, when the bank note 108 is conveyed in the reverse direction in step S901 (N), steps to step S905 are the same as step 701 to step S705 in the first embodiment. However, in the second embodiment, when a leading end of the bank note 108' arrives at the insert sensor 202, the central processor 301 stops scanning, which is conducted by the line sensor 401, at a point of time when the bank note 804 arrives at the insert sensor 202. The sensor memory is reversely searched from the point of time when the leading end of the bank note passes through the insert sensor 202, and the sampling data are converted so that they can become the same pattern data as those of the case of conveyance in the normal direction, and the thus converted data are stored again. Therefore, the cutting point used for image processing becomes the position (1)' of the sensor memory 306 in the same manner as that of the case of conveyance in the normal direction.

As described above, operation is conducted in the second embodiment as follows. The sampling data, which have been once stored in the sensor memory 306, are reversely searched from the point of time when the leading end of the bank note passes through the insert sensor 202, and the thus searched sampling data are stored again so as to convert the pattern data. Further, the starting point at which the sampling data are stored again in the sensor memory 306 is made to be a cutting point by which image processing is conducted. Accordingly, the image obtained by this image processing becomes the same as the sensor memory image A1 in the case of conveyance in the normal direction. Therefore, it is possible to use the pattern image data in the case of conveyance in the normal direction stored in the dictionary data unit 310. Accordingly, it is possible to realize a bidirectional bank note discrimination processing without arranging an insert sensor on the delivery side of the processing apparatus 103 for discrimination.

Third Embodiment

In the third embodiment, the insert sensor 202 is arranged only on the entry side of the processing apparatus 103 for discrimination, and the bank note 108 is conveyed in the conveyance passage 201 in two directions of the normal and the reverse direction.

The third embodiment is different from the first embodiment in the following points. In the third embodiment, the insert sensor is arranged at a position on the entry side of the processing apparatus for discrimination so that the distance L1 between the insert sensor and the line sensor can be shorter than the length "1" of the bank note in the direction of conveyance.

Referring to FIG. 10, explanations will be made into the sensor memory image in the third embodiment of the invention in the case of conveyance in the normal direction and also in the case of conveyance the reverse direction. FIG. 10a is a view showing a case in which the bank note is conveyed in the normal direction, and FIG. 10b is the view showing a case in which the bank note is conveyed in the reverse direction.

FIG. 10a is a view showing a case in which the bank note 108 is conveyed in the normal direction (arrow→), which is the same as the sensor memory image A1 in the case shown in FIG. 6a in which the bank note 108 is conveyed in the normal direction in the first embodiment.

However, in the first embodiment, in order to reduce the memory capacity of the sensor, the line sensor starts scanning after it has waited for a predetermined period of time. However, in the third embodiment, the distance L1 is shorter than the length "1". Therefore, a period of time from when the leading end of the bank note 108 passes through the insert sensor 202' to when the leading end of the bank note 108 arrives at the line sensor 401 is short.

Accordingly, the portion of wasted reading of data sampling is small in the first storing portion of the sensor memory 306. Therefore, scanning conducted by the line sensor can be immediately started without waiting for a predetermined period of time.

As shown in FIG. 10a, after the bank note 108 has passed through the insert sensor 202', the storing of sampling data in the line sensor 401 in the case of conveyance of the bank note 108 in the normal direction and the processing of the sensor memory image A1 are the same as those of the first embodiment.

Next, referring to FIG. 10b, explanations will be made into a case in which the bank note is conveyed in the reverse direction. In the third embodiment, the insert sensor 202' is arranged on the entry side of the processing apparatus 103 for discrimination. Therefore, in the same manner as that of the first embodiment, the line sensor 401 conducts scanning so that data sampling can be made whenever the bank note 108' passes through the line sensor 401. Accordingly, data sampling is conducted under the condition of waste reading, and sampling data are stored in the sensor memory by the line unit. However, since the distance L1 is shorter than the length "1", when data sampling conducted by the line sensor 401 is stopped in the same manner as that of the first embodiment when a leading end of the bank note 108' passes through the insert sensor 202', it is impossible to complete data sampling of the entire image of the bank note 108'. As shown in FIG. 10b, sampling data obtained at a point of time when the leading end of the bank note shown by dotted lines arrives at the insert sensor 202' are a portion ($a_1, a_2, \ldots, a_x$) of the image of the bank note 108'. The sampling data stored in the sensor memory 306 at this point of time includes a portion of the image of the bank note indicated in the sensor memory image B3 shown in FIG. 10b.

Accordingly, in the third embodiment, in order to store the entire image of the bank note 108', even after the leading end of the bank note 108' has passed through the insert sensor 202', scanning conducted by the line sensor 401 is not stopped. That is, even after the leading end of the bank note 108' has passed through the insert sensor 202', scanning is continuously conducted for a predetermined period of time so that the data can be sampled. Concerning this predetermined period of time, for example, in the case where the distance L1 is half of the width "1" of the bank note 108', since data sampling ($a_x$) has already been conducted on a half portion from the leading end of the bank note 108', this predetermined period of time is set at a value so that the residual half portion can be positively subjected to data sampling. Then, data sampling is conducted until the entire image of the bank note 108' can be included, and the sampling data ($a_1, a_2, \ldots a_x, \ldots a_m$) obtained by the line sensor 202' are successively stored in the sensor memory 306 by the line unit.

After sampling data from sampling data $a_1$ to sampling data $a_m$ have been stored in the sensor memory 306, the sensor memory image B2 shown in FIG. 10b can be obtained. The above predetermined period of time is set at a value so that data of the entire image of the bank note can be collected. Data processing after that can be performed in the same manner as that of the first embodiment.

Next, referring to the flow chart shown in FIG. 11, the operation of processing for discrimination of the processing apparatus 103 for discrimination of the third embodiment will be explained below.

When a user starts the operation of the automatic teller machine, the central processor 301 of the processing apparatus 103 for discrimination detects whether the conveyance direction is normal or reverse according to whether it is in a money depositing mode or money withdrawing mode. When it is a money depositing mode and the central processor 301 judges that the conveyance direction of the bank note is normal (S1101), the conveyance motor 312 is driven in the normal direction.

In this case, when the bank note 108 is conveyed in the normal direction, steps from S1101 to S1102 are the same as those of the first embodiment. However, in step 1103, immediately after the bank note 108 has passed through the insert sensor 202', scanning conducted by the line sensor is started.

On the other hand, in step S1101, when the bank note conveyance direction is reverse (N), it a payment mode.

Therefore, the central processor 301 drives the conveyance motor 312 in the reverse direction. Then, scanning is started by the line sensor 401 at an interval by which sampling can be surely conducted by the passage of one time of the bank note. Sampling data obtained by scanning conducted by the line sensor 401 are stored in the sensor memory 306 by the line unit (S1104).

Next, the central processor 301 monitors whether or not the leading head of the bank note 108', which has passed through the line sensor 401, passes through the insert sensor 202' (S1105).

Unless the bank note passes through the insert sensor 202', the program returns to step S1104, and scanning is continued by the line sensor 401 at a predetermined interval. In this case, when the bank note 108' passes through the line sensor 401 and a leading end of the bank note 108 arrives at the insert sensor 202', the central processor 301 does not make the line sensor 401 stop scanning at the point of time of arrival of the bank note 108' at the insert sensor 202' but it continues scanning until the entire image of the bank note 108' is read out, and the sampling data $(a_1, a_2, \ldots a_x, \ldots a_m)$ are stored in the sensor memory 306 by the line unit (S1106).

Then, the position (1) at the point of time when the line sensor 401 stops scanning is made to be a cutting point of the sensor memory 306, and the sensor memory 306 is read out for image processing.

As described above, in the case where the distance L1 is shorter than the length "1" of the bank note, scanning is continuously conducted until the entire image of the bank note 108' is read out, and the thus obtained sampling data $(a_1, a_2, \ldots a_x, \ldots a_m)$ are stored in the sensor memory 306. Therefore, an image obtained by this image processing can positively express the sensor memory image A1 in the case of conveyance in the normal direction. In this way, the bidirectional processing for discrimination can be realized without arranging an insert sensor on the delivery side of the processing apparatus 103 for discrimination.

Fourth Embodiment

Referring to FIG. 12, the fourth embodiment will be explained below. In this case, the insert sensor 202 in the processing apparatus 103 for discrimination is arranged on the entry side of the processing apparatus 103 for discrimination, and the bank note 108 is conveyed in the conveyance passage 201 in two directions of the normal and the reverse direction with respect to the processing apparatus 103 for discrimination.

The sensors in the fourth embodiment are arranged in the same manner as that of the first embodiment. That is, as shown in FIG. 12a, an arrangement of the sensors in the case of conveying the bank note in the normal direction is the same as that of the first embodiment shown in FIG. 6a. Therefore, a sensor memory image in the case of conveying the bank note in the normal direction in the fourth embodiment is the same as sensor memory image A1 shown in FIG. 6a.

However, the fourth embodiment is different from the first embodiment as follows. In fourth embodiment, the scanning direction of the line sensor is made to be opposite to that in the case of conveying the bank note in the normal direction. Due to the foregoing, the reference pattern data are made to be used in common.

Referring to FIG. 12, the fourth embodiment will be explained below. However, as shown in FIG. 12a, when the bank note 202 is conveyed in the normal direction, conveyance is conducted in the same manner as that of the first embodiment. Therefore, explanations are omitted here.

On the other hand, referring to FIG. 12b, explanations will be made into a case in which the bank notes 108' is conveyed to the processing apparatus 103 for discrimination in the reverse direction.

In this case, the line sensor 401 is set so that operation can be conducted in the leading direction "b" (arrow↓) which is opposite to the direction in the case of conveying the bank note in the normal direction. Since the insert sensor 202 is not arranged on the delivery side of the processing apparatus 103 for discrimination, even if the bank note 108' is conveyed, the processing apparatus 103 for discrimination cannot detect an arrival of bank note 108'. Therefore, the central processor 301 detects that it is a payment mode and drives the conveyance motor 312 so that the bank note can be conveyed in the reverse direction. At the same time, the central processor 301 controls the line sensor 401 to start sampling so that the bank note 108' can pass through the processing apparatus 103 for discrimination at any time. At this time, the scanning direction is "b" (arrow↓) which is reverse to the scanning direction in the case of conveying the bank note in the normal direction. Then, sampling is conducted at intervals so that data can be surely accommodated in the memory when the bank note 108' passes through the sensor once. The procedure of accommodating the sampling data is the same as that of the first embodiment.

However, the scanning direction of the line sensor 401 is "b" which is reverse to the direction "a" in the case of conveying the bank note in the normal direction. Therefore, the sensor memory image shown in FIG. 12b is an image obtained when the sensor memory image in the case of conveying the bank note in the normal direction shown in FIG. 12a is rotated by angle 180°.

Figure 13A:
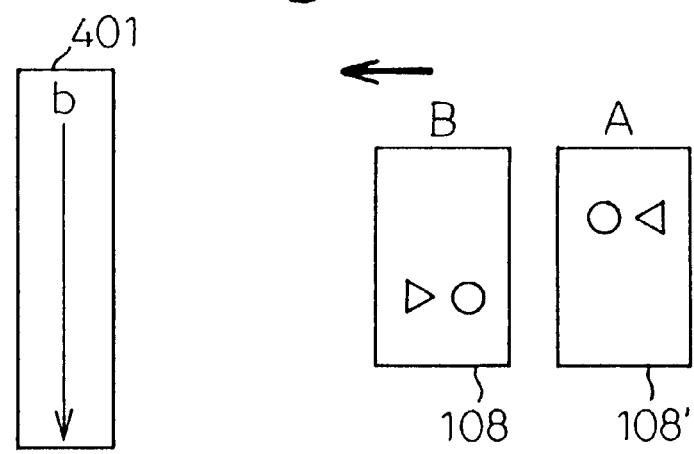
FIGS. 13a and 13b are views showing a relation between a bank note in the case of conveyance in the reverse direction and a sensor memory image in the fourth embodiment.

Referring to FIG. 13, explanations will be made into a relation between the direction of the bank note and the sensor memory image. FIG. 13 shows a case in which the bank notes 108, 108' are conveyed to the processing apparatus 103 for discrimination in the reverse direction. At this time, the line sensor 401 conducts scanning in the direction "b" (arrow↓) which is reverse to the scanning direction "a" in the case of conveying the bank note in the normal direction.

That is, scanning is conducted from top to bottom in the drawing, and data sampling is conducted on the bank notes 108 and 108' from top to bottom. The data are shown in the drawing by arrows $b_1, b_2, \ldots, b_m$. The conveying direction of the bank note 108 is direction A, and the conveying direction of the bank note 108' is direction B. In this case, when the line sensor 401 conducts scanning from top to bottom, data sampling is conducted on the bank note 108 from top to bottom at predetermined intervals from the leading end of the bank note in order.

Sampling data $b_1, b_2, \ldots, b_m$ are stored in the sensor memory 306 in the order of arrow $b_1$ to arrow $b_m$. These arrow directions are the same as those of the case shown in FIG. 12a in which the bank note is conveyed in the normal direction.

Figure 13B:
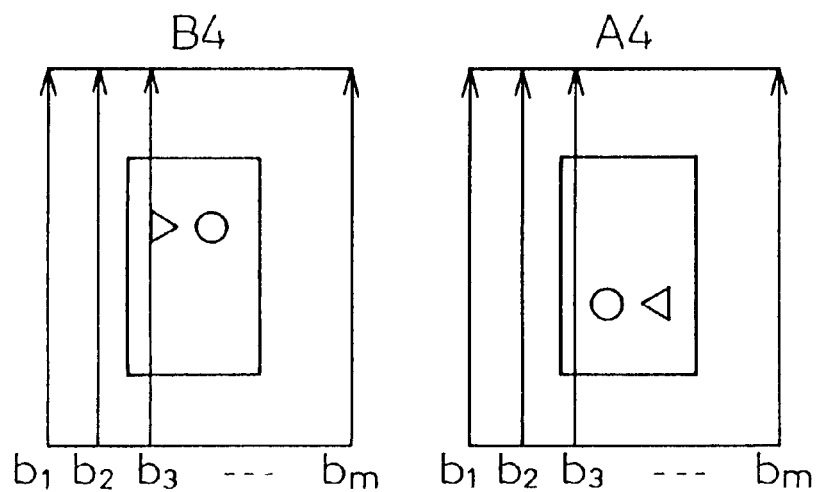

As shown in FIG. 13b, with respect to the bank note 108 in the direction A, the memory image becomes sensor memory image A4, and with respect to the bank note 108' in the direction A, the memory image becomes sensor memory image B4. This sensor memory image B4 in FIG. 13b is the same as the sensor memory image shown in FIG. 12b.

Accordingly, when the sensor memory image shown in FIG. 13b and the sensor memory image shown in FIG. 4b are compared with each other, sensor memory image A4 obtained in the case of conveying the bank note in the reverse direction is the same as sensor memory image A1 obtained in the line sensor direction "a" in the case of conveying the bank note in the normal direction, and sensor memory image B4 obtained in the case of conveying the bank note in the reverse direction is the same as sensor memory image B1 obtained in the line sensor direction "a" in the case of conveying the bank note in the normal direction. Accordingly, it is possible to use the reference pattern data of the dictionary data unit 310 in common.

Figure 14:
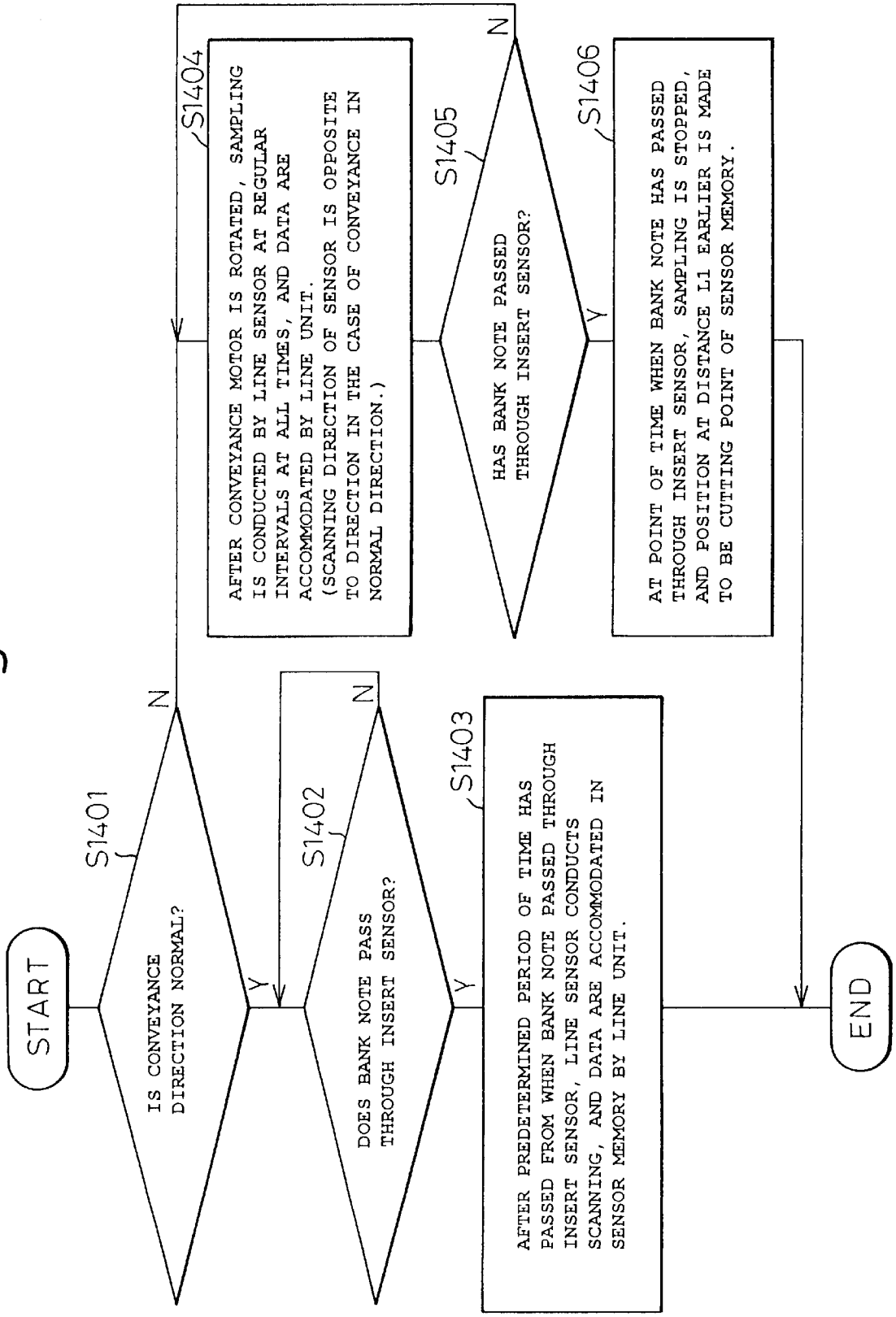
FIG. 14 is a flow chart showing the scanning of a line sensor and image processing in the fourth embodiment.

FIG. 14 is a flow chart of processing conducted in the fourth embodiment. In the steps from S1401 to S1406, when the bank note 1204 is conveyed in the reverse direction, the scanning direction of the line sensor 401 is made to be reverse to the direction of the case of conveying the bank note in the normal direction. Except for that, the flow chart of the fourth embodiment is the same as that of the first embodiment, and image processing and discrimination between true and false are conducted.

As described above, image processing is conducted as follows. In the case of conveying the bank note in the reverse direction, while the line sensor scanning direction is made to be reverse to the direction in the case of conveying the bank note in the normal direction, data sampling is conducted, and a position determined by counting back the number of lines corresponding to distance L1 is made to be a cutting point of the image. Therefore, an image obtained in the image processing becomes the same as the sensor memory image in the case of conveying the bank note in the normal direction. Accordingly, it becomes possible to realize bidirectional processing for discriminating bank notes without providing an insert sensor on the delivery side of the processing apparatus 103 for discriminating bank notes.

Fifth Embodiment

Referring to FIG. 15, the fifth embodiment will be explained below. Also, in this case, sensors are arranged in the processing apparatus for discrimination 103 as shown in FIG. 2. The insert sensor 202 is arranged only on the entry side of the processing apparatus for discrimination 103, and the bank note 108 is conveyed to the processing apparatus for discrimination 103 in the conveyance passage 201 in two directions of the normal and the reverse direction.

The arrangement of the fifth embodiment is the same as that of the first embodiment. As shown in FIG. 15a, the arrangement of the sensors in the case of conveying the bank note in the normal direction is the same as that shown in FIG. 6a. In the first embodiment, when the bank note is conveyed in the reverse direction, the line sensor conducts sampling at all times, and at the point of time when a leading end of the bank note passes through the insert sensor 202, the line sensor stops sampling, and the cutting point of the sensor memory is determined at a position where it is returned by a distance between the insert sensor and the line sensor.

In the fifth embodiment, the line sensor scanning direction is the same as the direction of the case of conveying the bank note in the normal direction. However, when sampling data are stored in the sensor memory, the storing starting direction of the line unit is made to be reverse to the direction of the case of conveying the bank note in the normal direction. When the sampling data are read out from the sensor memory, the order is made to be the same as that of the case of conveying the bank note in the normal direction. As described above, the reference pattern data are made to be used in common.

As shown in FIG. 15a, a case in which the bank note 108 is conveyed in the normal direction is the same as the first embodiment shown in FIG. 6a.

On the other hand, a case in which the bank note 108' is conveyed in the reverse direction is shown in FIG. 15b. The procedure until a leading end of the bank note 108' arrives at the insert sensor 202 is the same as that of the first to the fourth embodiment. That is, the reading direction of the sensor 401 in the case of conveyance in the normal direction is the same as the reading direction of the sensor 401 in the case of conveyance in the reverse direction. However, in the fifth embodiment, the direction in which the sampling data $a_1, a_2, \ldots, a_m$ obtained by the line sensor 401 are stored in the sensor memory 306 is reverse to that in each embodiment described above. That is, as shown by sensor memory image B1 in FIG. 15b, the sampling data $(a_1, a_2, \ldots a_m)$ are accommodated in the sensor memory 306 from arrow $a_1$ to arrow $a_m$ in order by the line unit in the direction of arrow ($\downarrow$). Next, when the sampling data are read out from the sensor memory 306 so as to conduct image processing on the data, the cutting point is defined as position (2), and reading is started from $a_2$ at the position (2) and continued to $a_m$ at the position (1). In this case, reading is conducted in the direction ($\uparrow$) which is reverse to the direction ($\downarrow$) in the case of storing the data. Then, it becomes the same as sensor memory image A1 in the case of conveyance in the normal direction.

Figure 16:
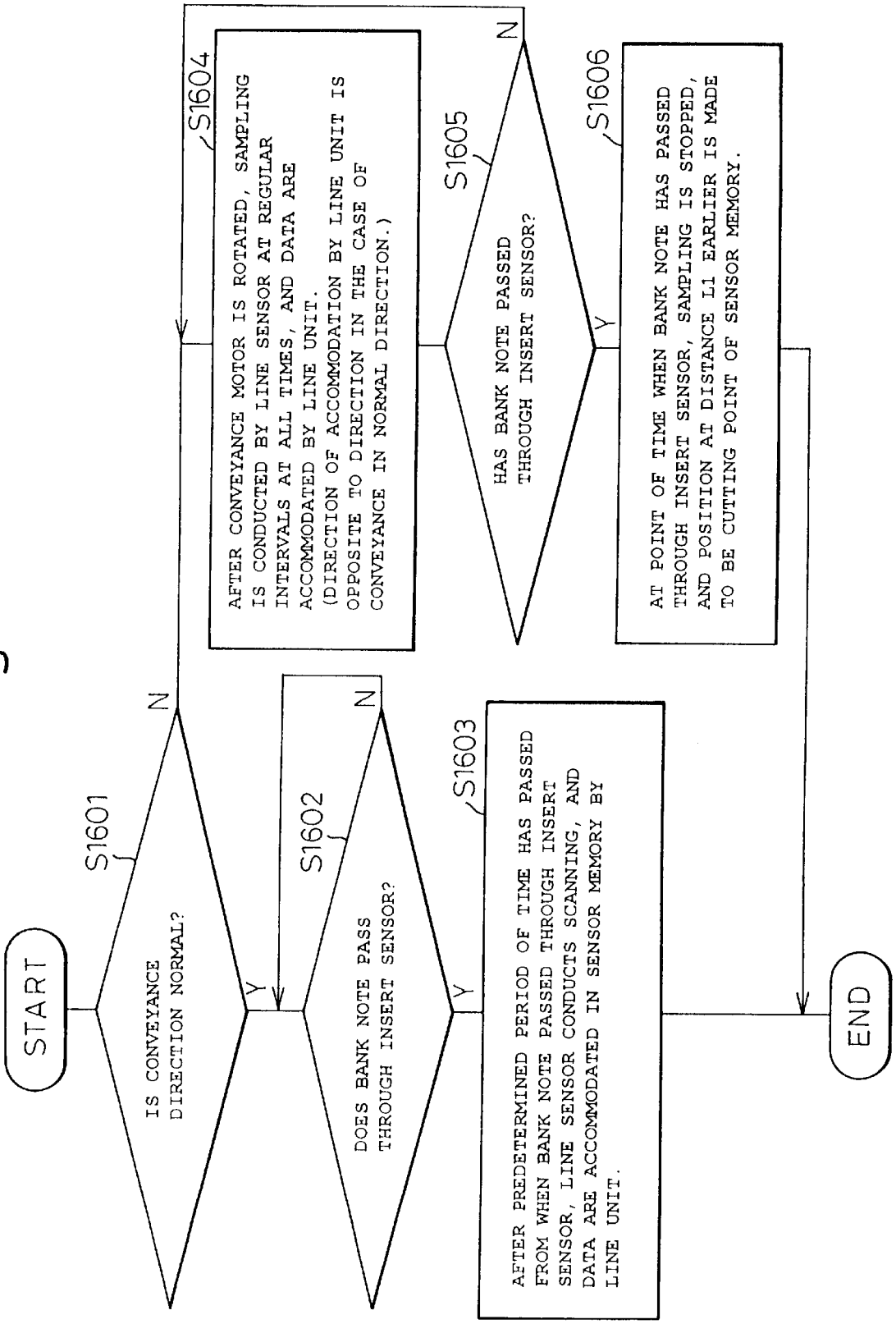
FIG. 16 is a flow chart showing the scanning of a line sensor and image processing in the fifth embodiment.

Next, the flow chart of the fifth embodiment is shown in FIG. 16.

Concerning the steps S1601 to S1606, the scanning direction of the line sensor 410 in the case of conveying the bank note 1504 in the reverse direction is the same as the direction "a" in the case of conveying the bank note 1504 in the normal direction. When the sampling data $(a_1, a_2, \ldots a_m)$ are accommodated in the sensor memory 306, they are accommodated in the direction of arrow ($\downarrow$) in order by the line unit. When the data are read out from the sensor memory 306, it is conducted in the same direction as that of the case of conveyance in the normal direction. Except for that, each step of this embodiment is the same as that of the fourth embodiment.

As described above, when the bank note is conveyed in the reverse direction, while the scanning direction of the line sensor is made to be the same as that in the case of conveying the bank note in the normal direction, data sampling is conducted. Also, when the bank note is conveyed in the reverse direction, concerning the accommodation start point for accommodating data in the sensor memory 306, accommodation of data is made in the reverse direction to the direction in the case of conveyance in the normal direction, and reading is conducted in the same direction as that in the case of conveyance in the normal direction. Then, image processing is conducted while a position counted back by the number of lines corresponding to distance L1 is determined to be a cutting point of the image. Therefore, an image obtained in this image processing becomes the same as the sensor memory image in the case of conveyance in the normal direction. Accordingly, it becomes possible to realize bidirectional processing for discriminating bank notes without providing an insert sensor on the delivery side of the processing apparatus 103 for discriminating bank notes.

Sixth Embodiment

In the same manner as that shown in FIG. 2, in the sixth embodiment, the insert sensor 202 is arranged only on the entry side of the processing apparatus for discrimination 103, and the bank note 108 is conveyed to the processing apparatus for discrimination 103 in the conveyance passage 201 in the two directions of the normal and the reverse direction. Concerning the sensors, specifically, the processing apparatus for discrimination 103 is provided with an optical sensor, a magnetic sensor and a thickness sensor. These sensors are arranged in the order of the optical sensor, the magnetic sensor and the thickness sensor when the sensors are viewed from the insert sensor side in the case of conveying the bank note in the normal direction.

Figure 17B:
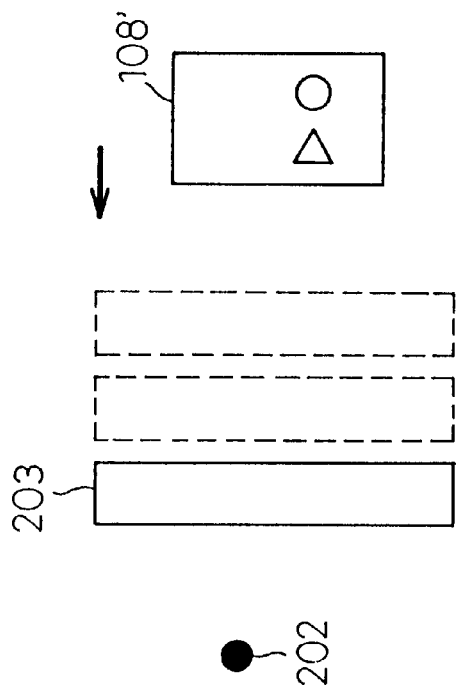
FIGS. 17a and 17b are schematic illustrations for explaining an outline of scanning conducted by a line sensor in the cases of conveyance in the normal and reverse direction in the sixth embodiment.
Figure 17A:
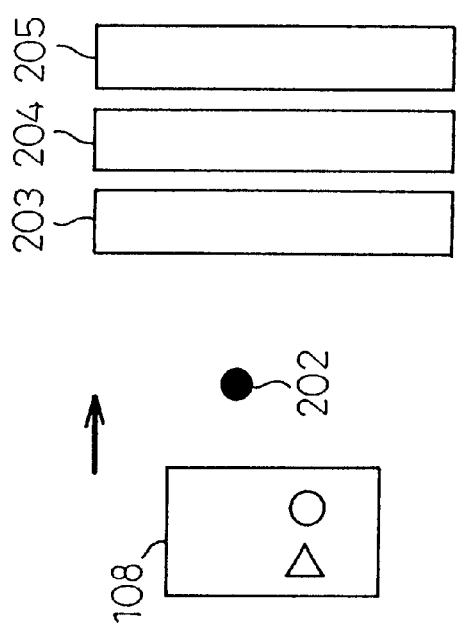

Referring to FIG. 17, the sixth embodiment will be explained below. FIG. 17a is a view showing a case in which the bank note 108 is conveyed in the normal direction, and FIG. 17b is a view showing a case in which the bank note 108' is conveyed in the reverse direction.

As shown in FIG. 17a, when the bank note 108 is conveyed in the normal direction (arrow→), the bank note 108 is subjected to data sampling in the order of the optical sensor 203, magnetic sensor 204 and thickness sensor 205. In this case, the optical sensor 203 grasps the entire figure pattern of the bank note 108. On the other hand, the magnetic sensor 204 and thickness sensor 205 detect a specific portion of the bank note 108. For the above reasons, after the optical sensor 203 has detected the entire figure pattern of the bank note 108, sampling data processing with respect to magnetic and thickness is conducted on the specific portion on the entire figure pattern.

In the case where the bank note 108' is conveyed in the reverse direction (arrow←), as shown in FIG. 17b, the bank note 108' passes through the thickness sensor, the magnetic sensor and the optical sensor 203 in this order. However, as described before, the order of processing of sampling data conducted by each sensor is the optical sensor 203, the magnetic sensor 204 and the thickness sensor 205. Therefore, processing of sampling data is conducted by the magnetic sensor 204 and thickness sensor 205 after processing of sampling data has been conducted by the optical sensor 203. Therefore, sampling data of the magnetic sensor 204 and the thickness sensor 205 are once held and, after the processing of sampling data of the optical sensor 203 has been completed, processing of sampling data of the magnetic sensor 204 and the thickness sensor 205 is carried out. For the above reasons, the period of time necessary for conducting processing of sampling data of each sensor becomes longer than that in the case of conveying the bank note in the normal direction.

To solve the above problems, in the case of conveying the bank note 108' in the reverse direction (arrow←), data sampling is not conducted with respect to magnetic and thickness, and data sampling is conducted only by the optical sensor 203. Due to the foregoing, processing time of data sampling can be reduced in the case of conveying the bank note in the reverse direction.

In this connection, in the sixth embodiment, the optical sensor, the magnetic sensor and the thickness sensor are arranged in this order, however, the order is not limited to the above specific embodiment. Even if the order is different from the above, when only the optical sensor conducts data sampling in the case of conveyance in the reverse direction, sampling data processing time can be reduced in the case of conveyance in the reverse direction.

Accordingly, the above method is effective when the process waits for the completion of sampling conducted by the optical sensor 203 and when sufficient time does not remain for judging the sampling data of magnetism and thickness. Further, the above method is effective when discrimination is simplified in such a manner that it is unnecessary to discriminate between true and false in the case of conveyance in the reverse direction and it is only necessary to specify the type of a bank note.

Figure 18:
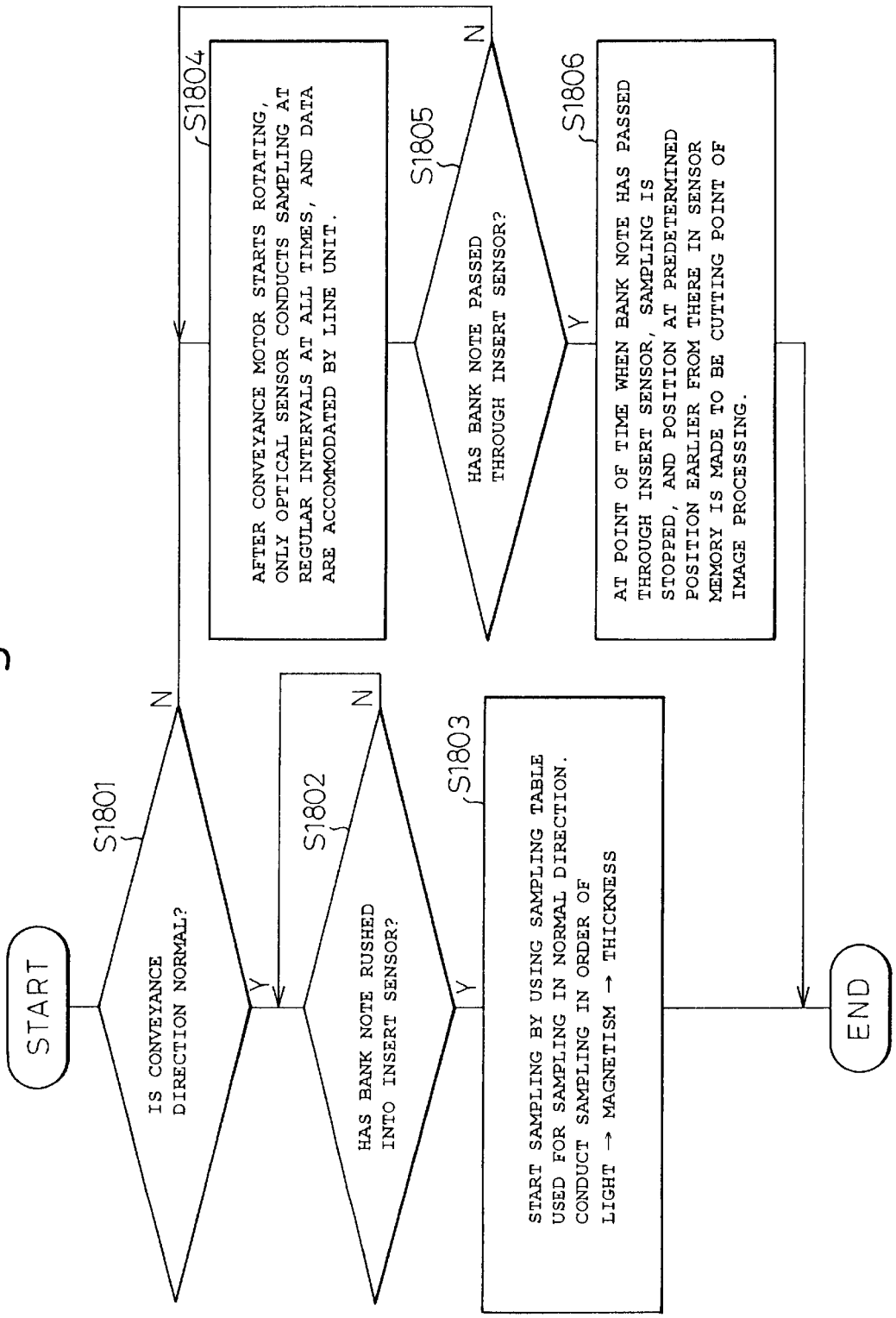
FIG. 18 is a flow chart showing the scanning of a line sensor and image processing in the sixth embodiment.

FIG. 18 is a flow chart showing the processing conducted in the sixth embodiment. In the case where the bank note 1701 is conveyed in the normal direction (Y), in step S1803, data sampling is carried out in the order of the optical sensor 203, the magnetic sensor 204 and the thickness sensor 205 (S1803). This is the same as the processing of data sampling in the case of conveyance in the normal direction in the first embodiment.

On the other hand, in the case where the bank note 186 is conveyed in the reverse direction (N), only the optical sensor 203 is made to conduct scanning at predetermined intervals at all times, and the thus obtained sampling data are accommodated in the sensor memory 306 by the line unit (S1804).

When a leading end of the bank note 108' passes through the insert sensor 202 (Y), the optical sensor 203 stops scanning, and the sampling data are read out from a predetermined position, that is, from a position at a distance L1 earlier in the sensor memory 306 (S1806).

When the same method as that of each embodiment described before is applied to data sampling conducted by each sensor, it is possible to make the reference pattern of the dictionary memory unit use in common. In the case of conveying the bank note in the normal direction, data sampling is conducted in the order of the optical sensor, magnetic sensor and thickness sensor, and image processing is conducted and the bank note is discriminated between true and false.

In the case of conveying the bank note in the reverse direction, only the optical sensor, among the various line sensors, is made to conduct scanning. Therefore, when the bank note is conveyed in the reverse direction, only processing of an image obtained by the optical sensor may be conducted. Accordingly, the reference pattern of the dictionary memory unit can be easily made so that it can be used in common, and it becomes possible to realize a bidirectional processing for discriminating bank notes without providing an insert sensor on the delivery side of the processing apparatus 103 for discrimination. Further, when the bank note is conveyed in the reverse direction, it is unnecessary to give consideration to pattern data of the magnetic and the thickness sensor. Accordingly, the speed of discrimination processing can be increased and the efficiency of processing can be enhanced.

Seventh Embodiment

As shown in FIG. 2, in the processing apparatus 103 for discrimination of the seventh embodiment, the insert sensor 202 is arranged only on the entry side of the processing apparatus 103 for discrimination, and the bank note 108 is conveyed in the conveyance passage 201 in two directions of the normal and the reverse direction. The procedure of data sampling conducted by the line sensor and the procedure of accommodating data into the sensor memory are the same as those of each embodiment described before.

As shown in FIG. 17a, in the seventh embodiment, the optical sensor, magnetic sensor and thickness sensor are arranged so that the bank note can pass through the optical sensor, the magnetic sensor and the thickness sensor in this order after the bank note has passed through the insert sensor in the case of conveyance in the normal direction.

On the other hand, between the processing apparatus 103 for discrimination and the bank note input port 102, there is provided a branch gate for selecting between the making of payment of the bank note into the bank note input port 102 and the stopping of payment of the bank note according to the result of discrimination made by the processing apparatus 103 for discrimination.

However, the sensors are arranged in the order of the optical sensor, the magnetic sensor and the thickness sensor. Therefore, in the case of the payment mode, that is, in the case of conveying the bank note in the reverse direction, the bank note passes through the thickness sensor, the magnetic sensor and the optical sensor in this order.

Therefore, as explained in the sixth embodiment, sampling data of the magnetic sensor 204 and the thickness sensor 205 are once held, and after processing of sampling data of the optical sensor 203 has been completed, sampling data of the magnetic sensor 204 and the thickness sensor 205 are processed. Therefore, a period of time necessary for completing all sampling processing of the sensors in the case of conveyance in the reverse direction becomes longer than that in the case of conveyance in the normal direction.

When the period of time necessary for completing all sampling processing of the sensors is long, the following problems may be encountered. When the conveyance speed in the case of conveyance in the reverse direction is the same as that in the case of conveyance in the normal direction, the bank note is discharged from the processing apparatus 103 for discrimination before the result of discrimination of the bank note is produced, and the bank note passes through the branch gate.

In order to solve the above problems, in the seventh embodiment, when the bank note is conveyed in the reverse direction, the bank note conveyance speed in the case of conveyance in the reverse direction is set to be slower than the bank note conveyance speed in the case of conveyance in the normal direction. When the bank note conveyance speed in the case of conveyance in the reverse direction is made slower than that in the case of conveyance in the normal direction, a period of time necessary for the bank note, which has been conveyed from the processing apparatus for discrimination, to reach the branch gate can be extended. Therefore, before the bank note reaches the branch gate, all sampling data processing of the optical, the magnetic and the thickness sensor can be completed.

This is effective when plenty of time is not left for judging magnetism and thickness after the completion of sampling data processing of the optical sensor like the sixth embodiment shown in FIG. 17b.

In this connection, in the seventh embodiment, the optical, the magnetic and the thickness sensor are arranged in this order. However, even if the order is different from the above, the reduction of the conveyance speed in the case of conveyance in the reverse direction is effective when a distance from the processing apparatus for discrimination to the branch gate is short.

Figure 19:
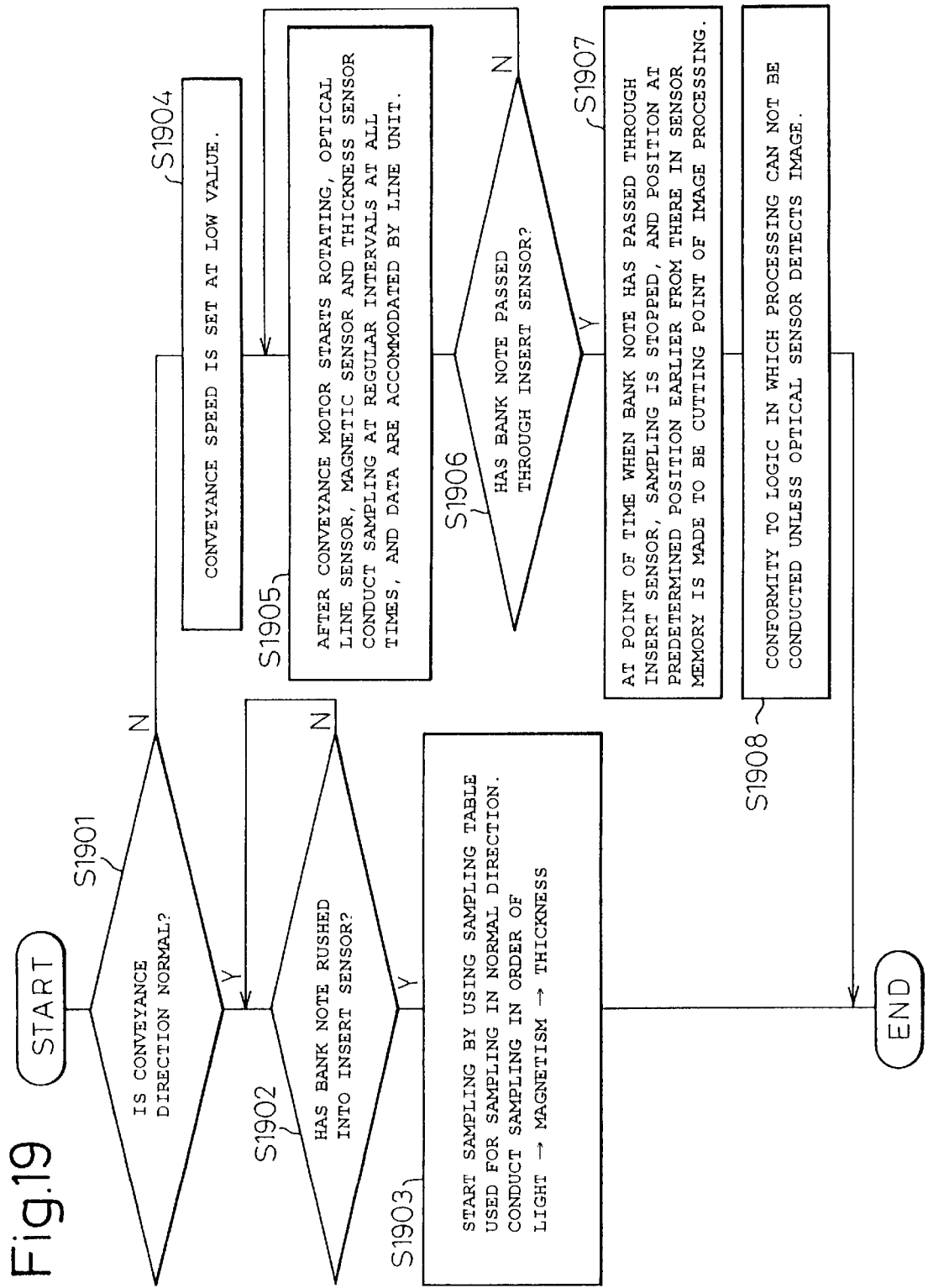
FIG. 19 is a flow chart showing the scanning of a line sensor and image processing in the seventh embodiment.

The flow chart of processing of the seventh embodiment is shown in FIG. 19. In the case of conveying the bank note in the normal direction (Y), data sampling is carried out in the order of the optical sensor, the magnetic sensor and the thickness sensor in step S1903, which is the same as the processing of data sampling in the case of conveyance in the normal direction in the sixth embodiment shown in FIG. 18.

On the other hand, in the case where the bank note is conveyed in the reverse direction (N), the central processor 103 drives the conveyance motor 312 in the reverse direction at a conveyance speed slower than a predetermined speed in the conveyance in the normal direction (S1904). In this connection, it is convenient to use a stepping motor for the conveyance motor because speed adjustment can be made easily.

Scanning is conducted by the optical, the magnetic and the thickness sensors at predetermined intervals at all times, and the thus obtained sampling data are accommodated in the sensor memory 306 by the line unit (S1905).

When a leading end of the bank note passes through the insert sensor (S1906), a sampling operation of the sensor is stopped at the point of time when the bank note has passed through the insert sensor, and a position returned by the number of lines corresponding to distance L1 is made to be a cutting point of image processing in the sensor memory 306 (S1907).

As described above, in the seventh embodiment, it is possible to use the reference pattern data of the dictionary data section in common. Further, since the conveyance speed in the case of conveyance in the reverse direction is made to be slower than the conveyance speed in the case of conveyance in the normal direction, it is possible to provide plenty of time before the bank note proceeds and reaches the branch gate. Therefore, all the sensors, of light, magnetism and thickness, can conduct processing, and the accuracy of discrimination can be enhanced.

Eighth Embodiment

In the eighth embodiment, in the same manner as that of each embodiment described above, it is possible to use the reference pattern data of the dictionary data section in common. Especially, in this embodiment, the insert sensor 202 is also arranged on the delivery side so as to realize the bidirectional conveyance of the processing apparatus for discrimination 103.

Figure 20:
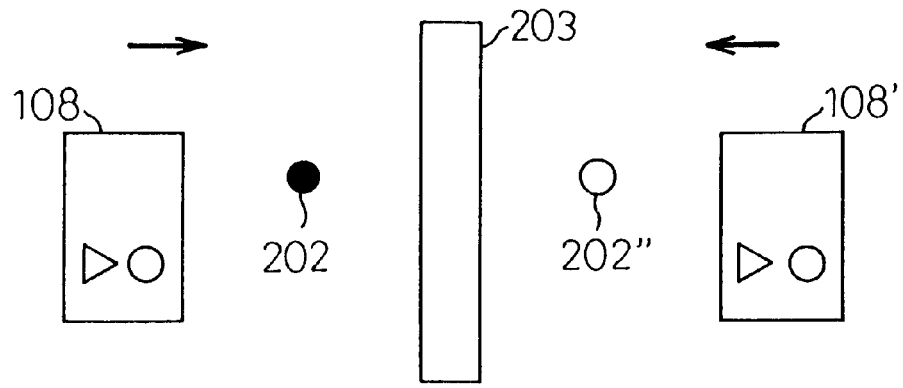
FIG. 20 is a view for explaining an arrangement of an insert sensor in the eighth embodiment.

As shown in FIG. 20, the sensors are arranged in the processing apparatus for discrimination 103 as follows. On the entry side of the processing apparatus for discrimination 103, there is provided an insert sensor 202. Also, on the delivery side of the processing apparatus for discrimination 103, there is provided an insert sensor 202". Further, the sensors are composed of only an optical sensor 203.

In this case, when the output of the insert sensor 202 and the output of the insert sensor 202" are respectively electrically connected with OR circuit (not shown), arrival of the bank note can be detected on either the entry or the delivery side.

Accordingly, at a point of time when the above OR circuit outputs a signal, the central processor 301 judges that the bank note has arrived, and the optical sensor 203 is made to start scanning while the output from OR circuit is used as a trigger, and data sampling is conducted.

FIG. 20 is a view showing an example. However, it should be noted that the invention is not limited to the above specific embodiment, and it is possible to provide a magnetic sensor and others in addition to the optical sensor 203.

The eighth embodiment is characterized in that a point of time at which scanning is started by the line sensor is detected by the output of OR circuit. The accommodation procedure of sampling data, which have been obtained when the line sensor conducts scanning, into the sensor memory 306, and the reading procedure of reading data from the sensor memory 306 for making pattern image data are the same as those of other embodiments described before. The only different point is that a trigger to start scanning of the optical sensor 203 is obtained from the output from OR circuit. Therefore, it is unnecessary to change software of control processing in the central processor 103.

Figure 21:
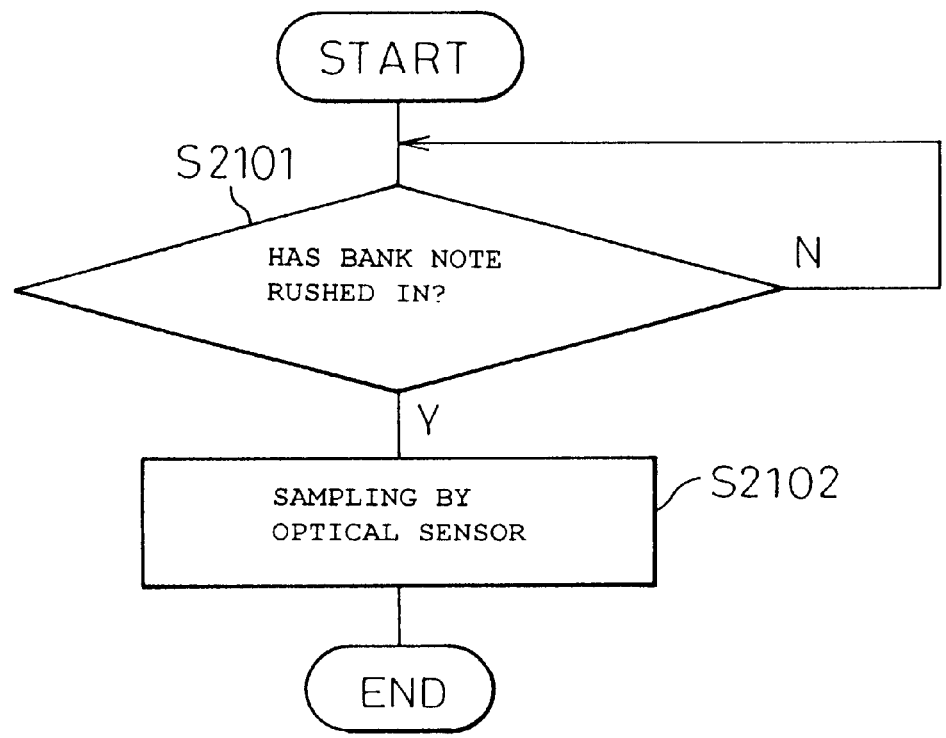
FIG. 21 is a flow chart showing operation of an insert sensor in the eighth embodiment.

FIG. 21 is a flow chart showing the processing conducted in the eighth embodiment.

When the above OR circuit, which is provided in the processing apparatus for discrimination 103, is turned on, it is detected that a leading end of the bank note has moved into either the insert sensor 202 or 202" (S2101). At the point of time when OR circuit outputs a signal, the central processor 103 makes the optical sensor 203 start scanning, and the optical sensor 203 conducts data sampling (S2102). After that, operation is conducted in the same manner as that of other embodiments.

Ninth Embodiment

In the same manner as that of each embodiment described above, according to the ninth embodiment, the reference pattern data of the dictionary data section 310 in the processing apparatus for discrimination 103 are made to be used in common. Especially, the ninth embodiment realizes a bidirectional conveyance in the processing apparatus for discrimination 103 by arranging sensors symmetrically from the physical viewpoint.

Figure 22:
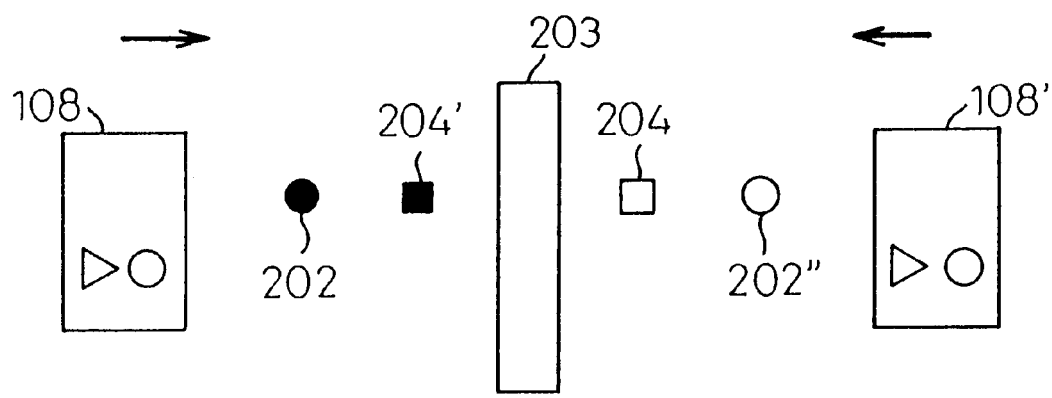
FIG. 22 is a view for explaining an arrangement of an insert sensor and magnetic sensor in the ninth embodiment.

FIG. 22 is a view showing a case in which sensors are arranged on both the entry and the delivery side in the processing apparatus for discrimination 103. For example, the optical sensor 203 is arranged at the center, and the insert sensor 202 and the magnetic sensor 204 are arranged on the entry side, and also the insert sensor 202" and the magnetic sensor 204' are arranged on the delivery side. That is, the insert sensor 202 and the magnetic sensor 204' are arranged symmetrically to the insert sensor 202" and the magnetic sensor 204 with respect to the optical sensor 203 from the physical viewpoint.

According to the ninth embodiment, the sensors are arranged symmetrically to each other with respect to the optical sensor from the physical viewpoint. Therefore, the point of time to start scanning by the optical sensor 203 in the case of conveyance in the normal direction is the same as that in the case of conveyance in the reverse direction, and further the procedure of reading out sampling data from the sensor memory 306 in the case of conveyance in the normal direction is the same as that in the case of conveyance in the reverse direction. As described above, software of control processing in the central processor 103 can be used in common or simplified.

Effect of the Invention

Each embodiment of the present invention is explained above. According to the present invention, it is possible to realize a bidirectional processing for discrimination characterized as follows. Passage of a bank note is detected by the insert sensor, and this detection signal is made to be a trigger to start data sampling conducted by the line sensor. Further, when consideration is given to the scanning direction of the line sensor, the accommodation direction of sampling data, which are obtained by the line sensor, into the sensor memory and the reading-out direction of sampling data from the sensor memory, the reference pattern data in the dictionary data unit for discrimination processing can be made to be used in common, and the memory capacity can be reduced.

What is claimed is:

1. A processing apparatus for discriminating various types of paper, comprising:

a line sensor scanning various types of paper conveyed into the processing apparatus and for conducting data sampling;

an insert sensor detecting the conveyance of various types of paper, arranged on one side of the line sensor;

a sensor memory accommodating sampling data, which are obtained by the line sensor, by a line unit; and means for making pattern image data by obtaining sampling data in a predetermined reading-out direction from the sensor memory for accommodating the sampling data, wherein in a case where various types of paper are conveyed from one side of the line sensor, data sampling is started when the insert sensor detects the passage of the various types of paper, in a case where various types of paper are conveyed from the other side of the line sensor, data sampling is started before the various types of paper are conveyed, and the various types of paper are discriminated by the thus made pattern image data and reference pattern data corresponding to the pattern image.

2. A processing apparatus for discriminating various types of paper according to claim 1, wherein the insert sensor arranged on one side of the line sensor is arranged at a position, located a distance from the line sensor which is longer than a length of a longest of the various types of paper.

3. A processing apparatus for discriminating various types of paper according to claim 2 wherein, in the case where the various types of paper are conveyed from one side of the line sensor, the line sensor starts data sampling after a predetermined period of time has passed from a point of time when the various types of paper passed through the insert sensor.

4. A processing apparatus for discriminating various types of paper according to claim 3, wherein sampling data accommodated in the sensor memory, from a position at which the accommodation has started to a position at which the accommodation has stopped, are read out by the line unit so as to make the pattern image data.

5. A processing apparatus for discriminating various types of paper according to claim 2 wherein, in the case where the various types of paper are conveyed from the other side of the line sensor, accommodation of the sampling data into the sensor memory is stopped when a leading end of the various types of paper pass through the insert sensor.

6. A processing apparatus for discriminating various types of paper according to claim 5, wherein the sensor memory reads out sampling data by a line unit at the position where accommodation is stopped, and the sampling data are accommodated again at a top of the sensor memory.

7. A processing apparatus for discriminating various types of paper according to claim 6, wherein sampling data accommodated in the sensor memory from a position at which the accommodation has started to a position at which the accommodation has stopped are read out by the line unit so as to make the pattern image data.

8. A processing apparatus for discriminating various types of paper according to claim 5, wherein a position at which the accommodation is stopped in the sensor memory is made to be a cutting point, and accommodated sampling data are read out from the cutting point by a position at a predetermined number of lines earlier so as to make pattern image data.

9. A processing apparatus for discriminating various types of paper according to claim 2 wherein, in the case where the various types of paper are conveyed from the other side of the line sensor, the line sensor conducts scanning in a direction opposite to the direction in the case in which the various types of paper are conveyed from one side of the line sensor.

10. A processing apparatus for discriminating various types of paper according to claim 9, wherein a position at which the accommodation is stopped in the sensor memory is made to be a cutting point, and accommodated sampling data are read out from the cutting point by a position at a predetermined number of lines earlier so as to make pattern image data.

11. A processing apparatus for discriminating various types of paper according to claim 2 wherein, in the case where the various types of paper are conveyed from the other side of the line sensor, when sampling data obtained by the line sensor are accommodated in the sensor memory by the line unit, the sampling data are accommodated in a direction opposite to the direction of accommodation by the sensor memory in the case where the various types of paper are conveyed from one side of the line sensor.

12. A processing apparatus for discriminating various types of paper according to claim 11, wherein a position at a predetermined number of lines earlier in the sensor memory is made to be a cutting point, and sampling data of a predetermined number of lines from the cutting point are read out by the line unit so as to make pattern image data.

13. A processing apparatus for discriminating various types of paper according to claim 1, wherein in the case where the various types of paper are conveyed from the other side of the line sensor, when all sampling data relating to the various types of paper cannot be accommodated even after a leading end of the various types of paper has passed through the insert sensor, accommodation of the sampling data into the sensor memory is conducted until a predetermined period of time passes from a point of time when the various types of paper passed through the insert sensor.

14. A processing apparatus for discriminating various types of paper according to claim 13, wherein a position at which the accommodation is stopped in the sensor memory is made to be a cutting point, and accommodated sampling data are read out from the cutting point by a position at a predetermined number of lines earlier so as to make pattern image data.

15. A processing apparatus for discriminating various types of paper according to claim 1, wherein the line sensor includes an optical sensor section, a magnetic sensor section and a thickness sensor section, and when the various types of paper are conveyed from the other side of the line sensor, sampling data are obtained only from the optical sensor section in the line sensor.

16. A processing apparatus for discriminating various types of paper according to claim 1, wherein the line sensor includes an optical sensor unit, a magnetic sensor unit and a thickness sensor unit, and when the various types of paper are conveyed from the other side of the line sensor, a conveyance speed of the various types of paper is made to be slower than that in the case where the various types of paper are conveyed from the one side of the line sensor.

17. A processing apparatus for discriminating various types of paper, including a bank note, according to claim 1, wherein the insert sensor is also arranged on the other side of the line sensor, the bank note is detected on both sides of the line sensor, and scanning of the line sensor is started when arrival of the bank note is detected on either side of the line sensor.

18. A processing apparatus for discriminating various types of paper according to claim 17, wherein the line sensor includes an optical sensor unit, a magnetic sensor unit and a thickness sensor unit, and the magnetic sensor unit and the thickness sensor unit are respectively symmetrically arranged on opposite sides of the optical sensor unit.

19. A method of discriminating various types of paper comprising:
accommodating sampling data, which are obtained by scanning various types of paper which is conveyed, in a sensor memory by a line unit;
discriminating the various types of paper by pattern image data made from the sampling data and by reference pattern data to be compared with the pattern image data;
starting data sampling of a line sensor from a point of time when the various types of paper have passed through an insert sensor arranged on one side of the line sensor in a case where the various types of paper are conveyed on one side of the line sensor;
starting data sampling of the line sensor before the various types of paper are conveyed in a case where the various types of paper are conveyed on the other side of the line sensor; and
making pattern image data by reading out the sampling data from the sensor memory in a predetermined direction.

20. A method of discriminating various types of paper according to claim 19, wherein the insert sensor arranged on one side of the line sensor is arranged at a position, located a distance from the line sensor which is longer than a length of a longest of the various types of paper.

21. A method of discriminating various types of paper according to claim 20, wherein when the various types of paper are conveyed on one side of the line sensor and data sampling of the line sensor is started after a predetermined period of time have passed from a point of time when the various types of paper have passed through the insert sensor arranged on one side of the line sensor.

22. A method of discriminating various types of paper according to claim 21, wherein sampling data are read out by the line unit from a position where accommodation is started in the sensor memory to a position where accommodation is stopped so as to make pattern image data.

23. A method of discriminating various types of paper according to claim 20, wherein when the various types of paper are conveyed on the other side of the line sensor and accommodation of the sampling data into the sensor memory is stopped when a leading end of the various types of paper has passed through the insert sensor.

24. A method of discriminating various types of paper according to claim 23, wherein sampling data are read out by the line unit at a position in the sensor memory where accommodation is stopped and the sampling data are accommodated again at the top of the sensor memory.

25. A method of discriminating various types of paper according to claim 24, wherein sampling data are read out by the line unit from a position where accommodation is started in the sensor memory to a position where accommodation is stopped so as to make pattern image data.

26. A method of discriminating various types of paper according to claim 23, wherein a position where accommodation is stopped in the sensor memory is made to be a cutting point, and sampling data accommodated by a position at a predetermined number of lines earlier from the cutting point are read out by the line unit so as to make pattern image data.

27. A method of discriminating various types of paper according to claim 20, wherein when the various types of paper are conveyed on the other side of the line sensor, the line sensor conducts scanning in a direction opposite to that in the case where the various types of paper are conveyed on one side of the line sensor.

28. A method of discriminating various types of paper according to claim 27, wherein a position where accommodation is stopped in the sensor memory is made to be a cutting point, and sampling data accommodated by a position at a predetermined number of lines earlier from the cutting point are read out by the line unit so as to make pattern image data.

29. A method of discriminating various types of paper according to claim 20, wherein, when the various types of paper are conveyed on the other side of the line sensor, in a case where sampling data obtained by the line sensor are accommodated into the sensor memory by the line unit, accommodation is conducted in a direction opposite to the direction of accommodation in the sensor memory in a case where the various types of paper are conveyed on one side of the line sensor.

30. A method of discriminating various types of paper according to claim 29, wherein a position at a predetermined number of lines earlier from a position where accommodation has stopped in the sensor memory is made to be a cutting point, and sampling data of the predetermined number of lines from the cutting point are read out by the line unit so as to make pattern image data.

31. A method of discriminating various types of paper according to claim 19 wherein, when the various types of papers are conveyed on the other side of the line sensor, in a case where all sampling data relating to the various types of paper cannot be accommodated even if a forward end of the various types of paper passes through the insert sensor, accommodation of the sampling data into the sensor memory is conducted in a period of time from a point of time when the various types of paper have passed through the insert sensor to a point of time when a predetermined period of time has passed.

32. A method of discriminating various types of paper according to claim 31, wherein a position where accommodation is stopped in the sensor memory is made to be a cutting point, and sampling data accommodated by a position at a predetermined number of lines earlier from the cutting point are read out by the line unit so as to make pattern image data.

* * * * *

UNITED STATES PATENT AND TRADEMARK OFFICE
CERTIFICATE OF CORRECTION

PATENT NO.   : 6,839,458 B2  
DATED        : January 4, 2005  
INVENTOR(S)  : Masanori Mukai It is certified that error appears in the above-identified patent and that said Letters Patent is hereby corrected as shown below:

Title page,
Item [54], Title, change "PROCRESSING" to -- PROCESSING --.
Item [56], References Cited, FOREIGN PATENT DOCUMENTS, change "10-32110 A" to -- 10-302110 A --

Signed and Sealed this

Twenty-eighth Day of June, 2005

JON W. DUDAS
*Director of the United States Patent and Trademark Office*